United States Patent
Qin et al.

(10) Patent No.: US 12,443,852 B2
(45) Date of Patent: Oct. 14, 2025

(54) METHOD AND RELATED APPARATUS FOR SIGNALING ANOMALY DETECTION

(71) Applicant: HUAWEI TECHNOLOGIES CO., LTD., Guangdong (CN)

(72) Inventors: Zhen Qin, Xi'an (CN); Siwei Rao, Xi'an (CN); Qiang Ye, Xi'an (CN); Jia Lv, Xi'an (CN); Guangjian Tian, Hong Kong (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 622 days.

(21) Appl. No.: 17/752,848

(22) Filed: May 24, 2022

(65) Prior Publication Data

US 2022/0286263 A1    Sep. 8, 2022

Related U.S. Application Data

(63) Continuation of application No. PCT/CN2020/102680, filed on Jul. 17, 2020.

(30) Foreign Application Priority Data

Nov. 25, 2019  (CN) .......................... 201911168167.8

(51) Int. Cl.
*G06N 3/08*  (2023.01)
*G06N 3/00*  (2023.01)
(Continued)

(52) U.S. Cl.
CPC ............ *G06N 3/088* (2013.01); *H04L 41/344* (2022.05)

(58) Field of Classification Search
CPC ............ G06F 11/3452; G06F 11/3495; G06F 11/0751; G06F 11/30; G06F 11/3409;
(Continued)

(56) References Cited

U.S. PATENT DOCUMENTS 10,111,147 B1    10/2018   Prasad et al.
12,013,950 B2*    6/2024   Jurzak .................. G06F 21/552
(Continued)

FOREIGN PATENT DOCUMENTS

CN        103179594 A    6/2013
CN        104883703 A    9/2015
(Continued)

OTHER PUBLICATIONS

Yang Li et al, Dim Moving Target Detection Using Spatio-Temporal Anomaly Detection for Hyperspectral Image Sequences, IGARSS 2018, 4 pages.
(Continued)

*Primary Examiner* — Justin R Knapp

(57) ABSTRACT

Signaling analysis methods and apparatus are provided to obtain a to-be-detected signaling flow that includes N pieces of signaling. First feature construction is performed on a message type and an information element that are included in each of the N pieces of signaling to obtain a first feature sequence. The first feature sequence includes N first feature vectors which are in a one-to-one correspondence with the N pieces of signaling. The first feature sequence is input to a first signaling anomaly detection model to perform anomaly detection processing. A first anomaly detection result is produced indicating that the to-be-detected signaling flow is normal or abnormal. In this way, an anomaly caused due to an information element error can be covered. The method and the apparatus can be multiplexed between different protocols.

25 Claims, 15 Drawing Sheets

(51) Int. Cl.
*G06N 3/088* (2023.01)
*H04L 41/34* (2022.01)
*H04L 41/344* (2022.01)

(58) Field of Classification Search
CPC ............ G06F 11/3447; G06F 18/2178; G06F 18/24323; H04L 63/1425; H04L 41/344; G06N 20/00; G06N 3/044; G06N 3/045; G06N 7/01; G06N 3/088
See application file for complete search history.

(56) References Cited

U.S. PATENT DOCUMENTS

| | | | |
|---|---|---|---|
| 12,166,779 B2 * | 12/2024 | Axenie | ............... H04L 63/1425 |
| 2014/0124373 A1 | 5/2014 | Chen et al. | |
| 2018/0006900 A1 * | 1/2018 | Korycki | ................... H04Q 9/00 |
| 2019/0235202 A1 | 8/2019 | Smyth et al. | |
| 2020/0076842 A1 * | 3/2020 | Zhou | ..................... G06N 3/045 |

FOREIGN PATENT DOCUMENTS

| | | |
|---|---|---|
| CN | 205750068 U | 11/2016 |
| CN | 106685674 A | 5/2017 |
| CN | 107483791 A | 12/2017 |
| CN | 108039955 A | 5/2018 |
| CN | 108156001 A | 6/2018 |
| CN | 109067782 A | 12/2018 |
| CN | 109257351 A | 1/2019 |
| CN | 208739252 U | 4/2019 |
| CN | 208739253 U | 4/2019 |
| CN | 109902832 A | 6/2019 |
| CN | 110276409 A | 9/2019 |
| WO | 2018005210 A1 | 1/2018 |

OTHER PUBLICATIONS

Wu Pan, Technical Design and Implementation of Satellite Communication Network Anomaly Detection System, University of Electronic Science and Technology, Dec. 2011, 2 pages (abstract).

* cited by examiner

| | |
|---|---|
| Example of a message type and a key information element in a signaling message | |
| Message type: an update bearer response | |
| Key information element: an information element name, and an information element value of a text format (an information element value of a value format) | |

Optional combination manner 1: an update bearer response | an information element value of a text format Optional combination manner 2: an update bearer response | an information element value of a value format

FIG. 6

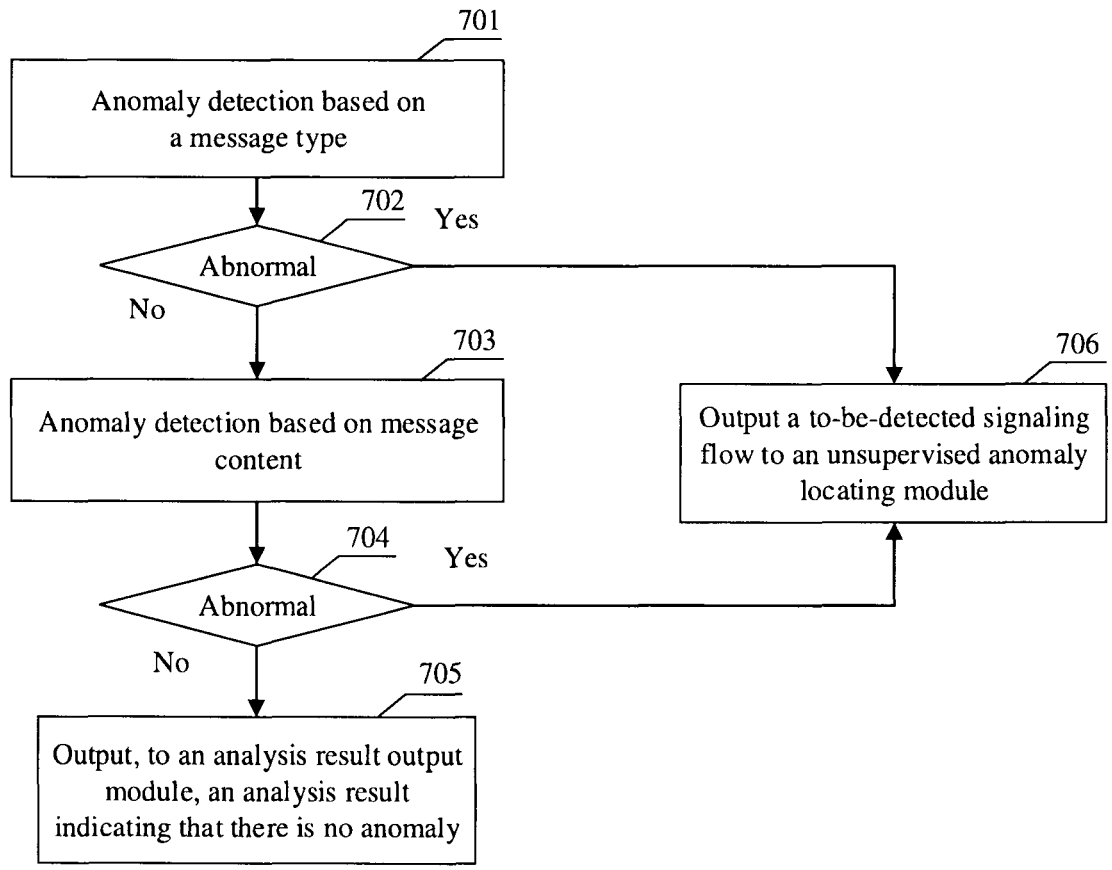

FIG. 7

METHOD AND RELATED APPARATUS FOR SIGNALING ANOMALY DETECTION

CROSS-REFERENCE TO RELATED APPLICATIONS

This application is a continuation of International Application No. PCT/CN2020/102680 filed on Jul. 17, 2020, which claims priority to Chinese Patent Application No. 201911168167.8 filed on Nov. 25, 2019. The disclosures of the aforementioned applications are hereby incorporated by reference in their entireties.

TECHNICAL FIELD

This disclosure relates to the artificial intelligence field, and in particular, to a signaling analysis method and a related apparatus.

BACKGROUND

To enable various devices in a communication network to operate in a coordinated manner, signaling, as a control instruction transmitted between the devices, not only can indicate a running status of the device, but also can provide a connection requirement for a related device. For example, when a user makes a call, an instruction needs to be encapsulated according to a specific protocol and then sent to a peer party, so that the peer party can identify and process the instruction. Information of the instruction includes a plurality of types of information such as a calling party, a called party, and an audio format, so that the peer party can complete a requirement in the instruction. The called party needs to respond to the instruction to indicate an instruction complete status, so that both parties in communication know a running status of each other. As data with a finest granularity for recording a service flow, signaling data needs to be analyzed for many fault problems in operation and maintenance, to complete works such as anomaly identification and fault problem definition.

Signaling data analysis actually has the following three characteristics. First, the data analysis has a large scale. An engineer often needs to analyze hundreds of or even thousands of pieces of signaling data at a time. Second, the signaling data has complex content. Different protocols correspond to different signaling formats. In addition, each piece of signaling further includes at least dozens of information elements with different service meanings in addition to message type information. Finally, different service logic in different protocols makes signaling analysis more complex. The signaling analysis often requires rich service knowledge and experience.

A current signaling analysis method and apparatus can meet only an application requirement in a specific signaling protocol, and cannot be multiplexed between different protocols. The fault signaling analysis in the communication network often involves a plurality of different protocols in a plurality of domains. In consideration of this, a common solution is to customize corresponding signaling analysis apparatuses for different protocols. This manner may cause resource waste and cause maintenance difficulty. Therefore, it is necessary to study a signaling analysis method that can be multiplexed between different protocols.

SUMMARY

Embodiments disclose a signaling analysis method and a related apparatus, to cover an anomaly caused due to an information element error. The method and the apparatus can be multiplexed between different protocols.

According to a first aspect, an embodiment provides a signaling analysis method. The method includes: obtaining a to-be-detected signaling flow, where the to-be-detected signaling flow includes N pieces of signaling, and N is an integer greater than 1; separately performing first feature construction on a message type and an information element that are included in each of the N pieces of signaling to obtain a first feature sequence, where the first feature sequence includes N first feature vectors, and the N first feature vectors are in a one-to-one correspondence with the N pieces of signaling; and inputting the first feature sequence to a first signaling anomaly detection model to perform anomaly detection processing, and outputting a first anomaly detection result, where the first anomaly detection result indicates that the to-be-detected signaling flow is normal or abnormal.

This embodiment may be executed by a device with a data processing function, for example, a server, a computer, or a cloud network element. Optionally, signaling in the to-be-detected signaling flow corresponds to the same protocol and the same interface. The interface corresponding to the signaling indicates an interface that generates the signaling. The interface is a boundary between two systems in a communication network, and is defined by a specific protocol or specification, to ensure compatibility of formats, functions, signals, and interconnections at the boundary. A protocol used for signaling in the to-be-detected signaling flow may be a session initiation protocol (SIP), an S1 application protocol (S1AP), or another signaling protocol. This is not limited in this application. In other words, the signaling analysis method provided in this embodiment of this application is applicable to different protocols, that is, can be multiplexed between different protocols. Each first feature vector in the first feature sequence is obtained through feature construction performed on a message type and an information element that are included in signaling corresponding to the first feature vector. Therefore, the first feature sequence is input to the first signaling anomaly detection model for anomaly detection processing, to parse out whether the message type and the information element are abnormal. It can be learned that the method provided in this embodiment of this application can comprehensively cover an anomaly caused due to an information element error. Therefore, the method provided in this embodiment of this application can cover an anomaly caused due to an information element error, and can be multiplexed between different protocols.

In an optional implementation, before the separately performing first feature construction on a message type and an information element that are included in each of the N pieces of signaling to obtain a first feature sequence, the method further includes: separately performing second feature construction on the message type included in each of the N pieces of signaling to obtain a second feature sequence, where the second feature sequence includes N second feature vectors, and the N second feature vectors are in a one-to-one correspondence with the N pieces of signaling; and inputting the second feature sequence to a second signaling anomaly detection model to perform anomaly detection processing, and obtaining a second anomaly detection result, where the second anomaly detection result indicates that the to-be-detected signaling flow is normal or abnormal. The separately performing first feature construction on a message type and an information element that are included in each of the N pieces of signaling to obtain a first feature sequence includes: when the second anomaly detection result indicates that the to-be-detected signaling flow is normal, separately performing the first feature construction on each of the N pieces of signaling to obtain the first feature sequence.

The inputting the second feature sequence to a second signaling anomaly detection model to perform anomaly detection processing may be understood as coarse-level (Coarse-level) anomaly detection based on a message type. The inputting the first feature sequence to a first signaling anomaly detection model to perform anomaly detection processing may be understood as fine-level (Fine-level) anomaly detection based on a message type and an information element. In other words, in comparison with inputting the first feature sequence to the first signaling anomaly detection model to perform anomaly detection processing (that is, a second round of anomaly detection), inputting the second feature sequence to the second signaling anomaly detection model to perform anomaly detection processing (that is, a first round of anomaly detection) costs a shorter processing time but has relatively low anomaly detection accuracy. If only the first signaling anomaly detection model is used to perform anomaly detection, the anomaly detection accuracy is relatively high but detection efficiency is relatively low. If only the second signaling anomaly detection model is used to perform anomaly detection, the anomaly detection accuracy is relatively low but detection efficiency is relatively high. It can be learned that detection efficiency and detection accuracy cannot be both considered when anomaly detection is performed by using only one signaling anomaly detection model. Because performing anomaly detection by using the second signaling anomaly detection model costs a very short time and can accurately detect most anomalies, the second signaling anomaly detection model may be used first to perform anomaly detection. After no anomaly is detected in the to-be-detected signaling flow by using the second signaling anomaly detection model, the first signaling anomaly detection model is then used to perform anomaly detection. After an anomaly is detected in the to-be-detected signaling flow by using the second signaling anomaly detection model, the first signaling anomaly detection model is no longer used to perform anomaly detection. In this implementation, the second signaling anomaly detection model is used first to perform anomaly detection, and after no anomaly is detected in the to-be-detected signaling flow by using the second signaling anomaly detection model, the first signaling anomaly detection model is then used to perform anomaly detection. In this manner, detection efficiency and detection accuracy can be both considered.

In an optional implementation, the separately performing first feature construction on a message type and an information element that are included in each of the N pieces of signaling to obtain a first feature sequence includes: sequentially performing the first feature construction on the N pieces of signaling according to an order of timestamps of the N pieces of signaling to obtain the first feature sequence.

In an optional implementation, the sequentially performing the first feature construction on the N pieces of signaling according to an order of timestamps of the N pieces of signaling to obtain the first feature sequence includes: using a combination of a first message type and a target information element as a whole, and performing feature construction on the combination to obtain a first vector. The first message type is a message type included in first signaling. The target information element is an information element included in the first signaling. The first signaling is any of the N pieces of signaling. The first vector is included in the first feature sequence.

A signaling analysis apparatus may use, as a word, a combination of a message type and an information element that are included in each piece of signaling, and perform feature construction on the word to obtain a first feature vector corresponding to each piece of signaling. In other words, the signaling analysis apparatus may consider each combination of a message type and an information element as a word, and perform feature construction by using a feature construction method for a word in natural language processing (Natural Language Processing, NLP). The feature construction method for a word includes but is not limited to one-hot encoding (One-hot) and bag of words encoding (Bag of Words, BoW). In this implementation, the combination of the message type and the information element that are included in the signaling is used as a word for feature construction. In this way, any signaling can be converted to a feature vector. This is applicable to signaling in different protocols.

In an optional implementation, the target information element includes an information element indicating a sending cause of the first signaling.

Optionally, the target information element includes only the information element indicating the sending cause of the first signaling. The information element indicating the sending cause of the signaling in the signaling may be referred to as a cause information element, for example, a cause information element indicating a service success cause or a service failure cause in the GTPv2-C protocol, or an eMM-cause information element indicating an eMM service status in the diameter protocol. The diameter protocol is a next-generation aaa protocol developed by the Internet engineering task force (The Internet Engineering Task Force, IETF). In this implementation, the combination of the message type and the target information element that are included in the first signaling is used as the word for feature construction, to improve anomaly detection accuracy.

In an optional implementation, the sequentially performing the first feature construction on the N pieces of signaling according to an order of timestamps of the N pieces of signaling to obtain the first feature sequence includes: using M information elements in second signaling as a text that includes one or more words in a natural language processing NLP algorithm, and performing feature construction on the text to obtain a second vector. The second signaling is any of the N pieces of signaling. The second vector is included in the first feature sequence. Herein, M is an integer greater than 1.

The M information elements are all or some of information elements in message content of the second signaling. In this implementation, the M information elements in the second signaling are used as the text that includes the one or more words, and feature construction is performed on the text to obtain the second vector. Therefore, an anomaly can be detected in an information element when anomaly detection is performed by using the first feature sequence including the second vector.

In an optional implementation, the separately performing second feature construction on the message type included in each of the N pieces of signaling to obtain a second feature sequence includes: sequentially performing the second feature construction on the N pieces of signaling according to the order of the timestamps of the N pieces of signaling to obtain the second feature sequence.

In an optional implementation, the sequentially performing the second feature construction on the N pieces of signaling according to the order of timestamps of the N pieces of signaling to obtain the second feature sequence includes: using a second message type as a word in the natural language processing NLP algorithm, and performing feature construction on the word to obtain a third vector. The second message type is a message type included in third signaling. The third signaling is any of the N pieces of signaling. The third vector is included in the second feature sequence.

In this implementation, the message type included in the signaling is used as the word for feature construction. In this way, any signaling can be converted to a feature vector. Therefore, an anomaly can be detected in a message type when anomaly detection is performed by using the second feature sequence including the third vector.

In an optional implementation, an $F^{th}$ first feature vector in the first feature sequence corresponds to an $F^{th}$ piece of signaling in the N pieces of signaling. The inputting the first feature sequence to a first signaling anomaly detection model to perform anomaly detection processing, and outputting a first anomaly detection result includes: in an $F^{th}$ round of anomaly detection processing, inputting a third feature sequence to the first signaling anomaly detection model, and performing anomaly detection processing to obtain a first set, where the first set includes at least one combination of a message type and an information element, and feature vectors in the third feature sequence are successively an $(F-K)^{th}$ first feature vector to an $(F-1)^{th}$ first feature vector in the first feature sequence, F is an integer greater than 1, and K is an integer greater than 1 and less than F; and outputting the first anomaly detection result when a combination of a message type and an information element of the $F^{th}$ piece of signaling in the N pieces of signaling is not included in the first set, where the first anomaly detection result indicates that the to-be-detected signaling flow is abnormal.

It should be understood that each combination in the first set is a combination that is of a message type and an information element of the $F^{th}$ piece of signaling and that is obtained through prediction. Optionally, for each feature vector in the first feature sequence, the signaling analysis apparatus may separately perform detection from a $1^{st}$ feature vector in the first feature sequence by using a sliding window with a window length of w and a step length of 1. Herein, w is an integer greater than 1. The signaling analysis apparatus may fill w placeholders before a $1^{st}$ first feature vector in the first feature sequence, to predict the $1^{st}$ first feature vector in the first feature sequence. When performing anomaly detection, the signaling analysis apparatus inputs a $(t-w)^{th}$ first feature vector to a (t-1)th first feature vector in the first feature sequence to the first signaling anomaly detection model, and performs anomaly detection processing to obtain at least one combination (corresponding to the first set) of a possible message type of a $t^{th}$ piece of signaling and a possible information element of the $t^{th}$ piece of signaling. If the combination of the message type and the information element of the $t^{th}$ piece of signaling in the to-be-detected signaling flow is not included in the at least one combination that is of the message type and the information element and that is obtained through prediction, it may be determined that the to-be-detected signaling flow is abnormal. In other words, the signaling analysis apparatus may use w pieces of signaling before the $t^{th}$ piece of signaling (corresponding to the $(t-w)^{th}$ first feature vector to the $(t-1)^{th}$ first feature vector in the first feature sequence), to detect whether the $t^{th}$ piece of signaling is abnormal. The first signaling anomaly detection model may be an N-gram model (N-Gram), a neural network language model (Neural Network Language Model, NNLM), or the like. The first signaling anomaly detection model may be obtained through unsupervised learning by using a normal signaling flow. The normal signaling flow indicates a signaling flow with no anomaly.

In this implementation, the signaling analysis apparatus can accurately and quickly detect abnormal signaling.

In an optional implementation, the method further includes: performing an $(F+1)^{th}$ round of anomaly detection processing when the combination of the message type and the information element of the $F^{th}$ piece of signaling is included in the first set and F is less than N; or outputting the first anomaly detection result when the combination of the message type and the information element of the $F^{th}$ piece of signaling is included in the first set and F is equal to N, where the first anomaly detection result indicates that the to-be-detected signaling flow is normal.

In this implementation, the anomaly detection result may be output in time, and the anomaly detection procedure may be stopped.

In an optional implementation, an $F^{th}$ second feature vector in the second feature sequence corresponds to an $F^{th}$ piece of signaling in the N pieces of signaling. The inputting the second feature sequence to a second signaling anomaly detection model to perform anomaly detection processing, and obtaining a second anomaly detection result includes: in an $F^{th}$ round of anomaly detection processing, inputting a fourth feature sequence to the second signaling anomaly detection model, and performing anomaly detection processing to obtain a second set, where the second set includes at least one message type, and feature vectors in the fourth feature sequence are successively an $(F-K)^{th}$ second feature vector to an $(F-1)^{th}$ second feature vector in the second feature sequence, F is an integer greater than 1, and K is an integer greater than 1 and less than F; and obtaining the second anomaly detection result when a message type of the $F^{th}$ piece of signaling in the N pieces of signaling is not included in the second set, where the second anomaly detection result indicates that the to-be-detected signaling flow is abnormal.

In this implementation, the signaling analysis apparatus performs detection on one piece of signaling in each round. The signaling analysis apparatus can quickly detect abnormal signaling and does not omit any signaling.

In an optional implementation, the method further includes: performing an $(F+1)^{th}$ round of anomaly detection processing when the message type of the $F^{th}$ piece of signaling is included in the second set and F is less than N; or obtaining the second anomaly detection result when the message type of the $F^{th}$ piece of signaling is included in the second set and F is equal to N, where the second anomaly detection result indicates that the to-be-detected signaling flow is normal.

In this implementation, the anomaly detection result may be output in time, and the anomaly detection procedure may be stopped.

In an optional implementation, after the inputting the first feature sequence to a first signaling anomaly detection model to perform anomaly detection processing, and outputting a first anomaly detection result, the method further includes: determining an anomaly location in the to-be-detected signaling flow when the first abnormality detection result indicates that the to-be-detected signaling flow is abnormal.

In this implementation, when it is detected that the to-be-detected signaling flow is abnormal, the anomaly location in the to-be-detected signaling flow may be further determined.

In an optional implementation, an $H^{th}$ first feature vector in the first feature sequence corresponds to an $H^{th}$ piece of signaling in the N pieces of signaling. The determining an anomaly location in the to-be-detected signaling flow includes: in an $H^{th}$ round of signaling anomaly locating, inputting a fifth feature sequence to the first signaling anomaly detection model, and performing anomaly detection processing to obtain a third set, where the third set includes at least one combination of a message type and an information element, and feature vectors in the fifth feature sequence are successively an $(H-L)^{th}$ first feature vector to an $(H-1)^{th}$ first feature vector in the first feature sequence, H is an integer greater than 1, and L is an integer greater than 1 and less than H; and when a combination of a message type and an information element of the $H^{th}$ piece of signaling in the N pieces of signaling is not included in the third set, determining that the $H^{th}$ piece of signaling is abnormal.

In this implementation, the abnormal signaling may be accurately determined from the to-be-detected signaling flow.

In an optional implementation, an $H^{th}$ first feature vector in the first feature sequence corresponds to an $H^{th}$ piece of signaling in the N pieces of signaling. The determining an anomaly location in the to-be-detected signaling flow includes: obtaining an anomaly probability sequence corresponding to the N pieces of signaling, where a $G^{th}$ probability in the anomaly probability sequence represents a probability that first (D+G) pieces of signaling in the N pieces of signaling include abnormal signaling, and G and D are both integers greater than 0; and determining the anomaly location in the to-be-detected signaling flow based on the anomaly probability sequence.

The $G^{th}$ probability in the anomaly probability sequence represents a probability that the first (D+G) pieces of signaling in the N pieces of signaling include abnormal signaling. In other words, the anomaly probability sequence may reflect an anomaly degree change of the to-be-detected signaling flow. Therefore, an interval of abnormal signaling can be located through analyzing the anomaly degree change of the to-be-detected signaling flow.

In this implementation, the anomaly location in the to-be-detected signaling flow is determined based on the anomaly probability sequence corresponding to the N pieces of signaling, to accurately determine the anomaly location in the to-be-detected signaling flow.

In an optional implementation, the obtaining an anomaly probability sequence corresponding to the N pieces of signaling includes: inputting a sixth feature sequence to the first signaling anomaly detection model, and performing anomaly detection processing to obtain a $G^{th}$ probability in the anomaly probability sequence. Feature vectors included in the sixth feature sequence are successively first (D+G) first feature vectors in the first feature sequence.

In this implementation, the anomaly probability sequence corresponding to the N pieces of signaling can be quickly and accurately obtained.

In an optional implementation, the determining the anomaly location in the to-be-detected signaling flow based on the anomaly probability sequence includes: when a difference between the $G^{th}$ probability and a $(G-1)^{th}$ probability in the anomaly probability sequence is greater than a probability threshold, determining that signaling in a first signaling interval is abnormal, where the first signaling interval includes a $(G+D-1)^{th}$ piece of signaling to an $N^{th}$ piece of signaling in the N pieces of signaling, and G is an integer greater than 1; when each probability in the anomaly probability sequence is not less than a previous probability, determining that signaling in a second signaling interval is abnormal, where the second signaling interval includes a $(P+D)^{th}$ piece of signaling to the $N^{th}$ piece of signaling in the N pieces of signaling, a difference between a $p^{th}$ probability and a $(P+1)^{th}$ probability in the anomaly probability sequence is not less than a difference between any two adjacent probabilities in the anomaly probability sequence, and P is an integer greater than 0; when a probability in the anomaly probability sequence increases from a first value to a second value and decreases from a third value to the first value before the second value is maintained, determining that signaling in a third signaling interval is abnormal, where the first value is less than a first threshold, the second value and the third value are both greater than a second threshold, the first threshold is less than the second threshold, the third signaling interval includes a $(Q+D)^{th}$ piece of signaling to the $N^{th}$ piece of signaling in the N pieces of signaling, a $Q^{th}$ probability in the anomaly probability sequence is a probability at a start point of a final rise section in an anomaly probability curve, and Q is an integer greater than 0; and when each probability in the anomaly probability sequence is not less than the probability threshold, determining that signaling in a fourth signaling interval is abnormal, where the fourth signaling interval includes a $D^{th}$ piece of signaling to the $N^{th}$ piece of signaling in the N pieces of signaling. The first threshold may be 0.2, 0.25, 0.3, or the like. The second threshold may be 0.6, 0.75, 0.8, or the like.

In this implementation, the anomaly location may be accurately determined from the to-be-detected signaling flow.

In an optional implementation, before the obtaining a to-be-detected signaling flow, the method further includes: collecting signaling data, where the signaling data includes the N pieces of signaling; parsing each piece of signaling in the signaling data, to obtain an interface, a timestamp, a protocol, and a flow identifier corresponding to each piece of signaling; dividing signaling corresponding to the same interface, protocol, and flow identifier in the signaling data into the same group, to obtain at least one group of signaling; and sorting signaling in a target group of signaling according to an order of timestamps included in signaling in the target group of signaling, to obtain the to-be-detected signaling flow, where the target group of signaling is any group of signaling in the at least one group of signaling.

In this implementation, the signaling belonging to the same signaling flow can be accurately and quickly screened out, to further obtain the to-be-detected signaling flow.

According to a second aspect, an embodiment provides a training method. The method includes: separately performing feature construction on a message type and an information element that are included in each piece of signaling in a signaling training flow to obtain a first vector sequence, where a feature vector in the first vector sequence is in a one-to-one correspondence with signaling in the signaling training flow; and using an $R^{th}$ feature vector to an $(R+W)^{th}$ feature vector in the first vector sequence as a first training feature sequence, inputting the first training feature sequence to a first training model to implement unsupervised learning, and obtaining a first signaling anomaly detection model, where the first training model is a W-gram language model, W is an integer greater than 1, and R and S are both integers greater than 0. The first signaling anomaly detection model may be an NNLM, or may be another sequence model. This is not limited in this application.

In this embodiment, the first signaling anomaly detection model that is used to predict a message type and an information element of one piece of signaling based on feature vectors corresponding to W pieces of signaling before this piece of signaling may be obtained through training. Training efficiency is high.

According to a third aspect, an embodiment provides a training method. The method includes: separately performing feature construction on a message type included in each piece of signaling in a signaling training flow to obtain a second vector sequence, where a feature vector in the second vector sequence is in a one-to-one correspondence with signaling in the signaling training flow; and using an $R^{th}$ feature vector to an $(R+W)^{th}$ feature vector in the second vector sequence as a second training feature sequence, inputting the second training feature sequence to a second training model to implement unsupervised learning, and obtaining a second signaling anomaly detection model, where the second training model is a W-gram language model, W is an integer greater than 1, and R and S are both integers greater than 0. The second signaling anomaly detection model may be an NNLM, or may be another sequence model. This is not limited in this application.

In this embodiment, the second signaling anomaly detection model that is used to predict a message type of one piece of signaling based on feature vectors corresponding to W pieces of signaling before this piece of signaling may be obtained through training. Training efficiency is high.

According to a fourth aspect, an embodiment provides a training method. The method includes: separately performing feature construction on a message type and an information element that are included in each piece of signaling in a signaling training flow to obtain a first training sample, where a feature vector in the first training sample is in a one-to-one correspondence with signaling in the signaling training flow; inputting the first training sample and first annotation information to a third training model, and performing anomaly detection processing to obtain a first anomaly detection processing result, where the first anomaly detection processing result indicates that the first training sample is a normal signaling flow or an abnormal signaling flow; determining, based on the first anomaly detection processing result and a first standard result, a loss corresponding to the first training sample, where the first standard result is a real result that is of the first training sample and that is indicated by the first annotation information; and updating a parameter of the third training model by using an optimization algorithm based on the loss corresponding to the first training sample, and obtaining a first signaling anomaly detection model. The third training model may be a recurrent neural network (Recurrent Neural Networks, RNN), a long short term memory (Long Short-Term Memory, LSTM) model, or another model. This is not limited in this application. A model obtained through training by using the third training model is the foregoing first signaling anomaly detection model. The signaling training flow may be any signaling flow. In actual application, a training apparatus may obtain the first signaling anomaly detection model through training by using an annotated normal signaling flow and an annotated abnormal signaling flow.

In this embodiment, the third training model is trained by using the annotated normal signaling flow and the annotated abnormal signaling flow, so that the first signaling anomaly detection model obtained after the training can accurately detect whether each signaling flow is abnormal.

According to a fifth aspect, an embodiment provides a training method. The method includes: separately performing feature construction on a message type included in each piece of signaling in a signaling training flow to obtain a second training sample, where a feature vector in the second training sample is in a one-to-one correspondence with signaling in the signaling training flow; inputting the second training sample and second annotation information to a fourth training model, and performing anomaly detection processing to obtain a second anomaly detection processing result, where the second anomaly detection processing result indicates that the second training sample is a normal signaling flow or an abnormal signaling flow; determining, based on the second anomaly detection processing result and a second standard result, a loss corresponding to a first training sample, where the second standard result is a real result that is of the second training sample and that is indicated by the second annotation information; and updating a parameter of the fourth training model by using an optimization algorithm based on a loss corresponding to the second training sample, and obtaining a second signaling anomaly detection model.

The fourth training model may be an RNN, or may be an LSTM model, or may be another model. This is not limited in this application. A model obtained through training by using the fourth training model is the foregoing second signaling anomaly detection model. The signaling training flow may be any signaling flow. In actual application, a training apparatus may obtain the second signaling anomaly detection model through training by using an annotated normal signaling flow and an annotated abnormal signaling flow.

In this embodiment, the fourth training model is trained by using the annotated normal signaling flow and the annotated abnormal signaling flow, so that the second signaling anomaly detection model obtained after the training can accurately detect whether each signaling flow is abnormal.

According to a sixth aspect, an embodiment provides a signaling analysis apparatus. The apparatus includes a processor and a memory. The memory is configured to store program instructions. The processor is configured to invoke the program instructions to perform the following operations: obtaining a to-be-detected signaling flow, where the to-be-detected signaling flow includes N pieces of signaling, and N is an integer greater than 1; separately performing first feature construction on a message type and an information element that are included in each of the N pieces of signaling to obtain a first feature sequence, where the first feature sequence includes N first feature vectors, and the N first feature vectors are in a one-to-one correspondence with the N pieces of signaling; and inputting the first feature sequence to a first signaling anomaly detection model to perform anomaly detection processing, and outputting a first anomaly detection result, where the first anomaly detection result indicates that the to-be-detected signaling flow is normal or abnormal.

In an optional implementation, the processor is further configured to: separately perform second feature construction on the message type included in each of the N pieces of signaling to obtain a second feature sequence, where the second feature sequence includes N second feature vectors, and the N second feature vectors are in a one-to-one correspondence with the N pieces of signaling; and input the second feature sequence to a second signaling anomaly detection model to perform anomaly detection processing, and obtain a second anomaly detection result, where the second anomaly detection result indicates that the to-be-detected signaling flow is normal or abnormal. The processor is specifically configured to: when the second anomaly detection result indicates that the to-be-detected signaling flow is normal, separately perform the first feature construction on each of the N pieces of signaling to obtain the first feature sequence.

In an optional implementation, the processor is specifically configured to sequentially perform the first feature construction on the N pieces of signaling according to an order of timestamps of the N pieces of signaling to obtain the first feature sequence.

In an optional implementation, the processor is specifically configured to: use a combination of a first message type and a target information element as a whole, and perform feature construction on the combination to obtain a first vector. The first message type is a message type included in first signaling. The target information element is an information element included in the first signaling. The first signaling is any of the N pieces of signaling. The first vector is included in the first feature sequence.

In an optional implementation, the target information element includes an information element indicating a sending cause of the first signaling.

In an optional implementation, the processor is configured to: use M information elements in second signaling as a text that includes one or more words in a natural language processing NLP algorithm, and perform feature construction on the text to obtain a second vector. The second signaling is any of the N pieces of signaling. The second vector is included in the first feature sequence. Herein, M is an integer greater than 1.

In an optional implementation, the processor is configured to sequentially perform the second feature construction on the N pieces of signaling according to the order of timestamps of the N pieces of signaling to obtain the second feature sequence.

In an optional implementation, the processor is specifically configured to: use a second message type as a word in the natural language processing NLP algorithm, and perform feature construction on the word to obtain a third vector. The second message type is a message type included in third signaling. The third signaling is any of the N pieces of signaling. The third vector is included in the second feature sequence.

In an optional implementation, the processor is configured to: in an $F^{th}$ round of anomaly detection processing, input a third feature sequence to the first signaling anomaly detection model, and perform anomaly detection processing to obtain a first set, where the first set includes at least one combination of a message type and an information element, and feature vectors in the third feature sequence are successively an $(F-K)^{th}$ first feature vector to an $(F-1)^{th}$ first feature vector in the first feature sequence, F is an integer greater than 1, and K is an integer greater than 1 and less than F; and output the first anomaly detection result when a combination of a message type and an information element of an $F^{th}$ piece of signaling in the N pieces of signaling is not included in the first set, where the first anomaly detection result indicates that the to-be-detected signaling flow is abnormal.

In an optional implementation, the processor is further configured to: perform an $(F+1)^{th}$ round of anomaly detection processing when the combination of the message type and the information element of the $F^{th}$ piece of signaling is included in the first set and F is less than N; or output the first anomaly detection result when the combination of the message type and the information element of the $F^{th}$ piece of signaling is included in the first set and F is equal to N, where the first anomaly detection result indicates that the to-be-detected signaling flow is normal.

In an optional implementation, an $F^{th}$ second feature vector in the second feature sequence corresponds to an $F^{th}$ piece of signaling in the N pieces of signaling. The processor is specifically configured to: in an $F^{th}$ round of anomaly detection processing, input a fourth feature sequence to the second signaling anomaly detection model, and perform anomaly detection processing to obtain a second set, where the second set includes at least one message type, and feature vectors in the fourth feature sequence are successively an $(F-K)^{th}$ second feature vector to an $(F-1)^{th}$ second feature vector in the second feature sequence, F is an integer greater than 1, and K is an integer greater than 1 and less than F; and obtain the second anomaly detection result when a message type of the $F^{th}$ piece of signaling in the N pieces of signaling is not included in the second set, where the second anomaly detection result indicates that the to-be-detected signaling flow is abnormal.

In an optional implementation, the processor is further configured to: perform an $(F+1)^{th}$ round of anomaly detection processing when the message type of the $F^{th}$ piece of signaling is included in the second set and F is less than N; or obtain the second anomaly detection result when the message type of the $F^{th}$ piece of signaling is included in the second set and F is equal to N, where the second anomaly detection result indicates that the to-be-detected signaling flow is normal.

In an optional implementation, the processor is further configured to determine an anomaly location in the to-be-detected signaling flow when the first abnormality detection result indicates that the to-be-detected signaling flow is abnormal.

In an optional implementation, an $H^{th}$ first feature vector in the first feature sequence corresponds to an $H^{th}$ piece of signaling in the N pieces of signaling. The processor is specifically configured to: in an $H^{th}$ round of signaling anomaly locating, input a fifth feature sequence to the first signaling anomaly detection model, and perform anomaly detection processing to obtain a third set, where the third set includes at least one combination of a message type and an information element, and feature vectors in the fifth feature sequence are successively an $(H-L)^{th}$ first feature vector to an $(H-1)^{th}$ first feature vector in the first feature sequence, H is an integer greater than 1, and L is an integer greater than 1 and less than H; and when a combination of a message type and an information element of the $H^{th}$ piece of signaling in the N pieces of signaling is not included in the third set, determine that the $H^{th}$ piece of signaling is abnormal.

In an optional implementation, an $H^{th}$ first feature vector in the first feature sequence corresponds to an $H^{th}$ piece of signaling in the N pieces of signaling. The processor is specifically configured to: obtain an anomaly probability sequence corresponding to the N pieces of signaling, where a $G^{th}$ probability in the anomaly probability sequence represents a probability that first (D+G) pieces of signaling in the N pieces of signaling include abnormal signaling, and G and D are both integers greater than 0; and determine the anomaly location in the to-be-detected signaling flow based on the anomaly probability sequence.

In an optional implementation, the processor is configured to: input a sixth feature sequence to the first signaling anomaly detection model, and perform anomaly detection processing to obtain a $G^{th}$ probability in the anomaly probability sequence, where feature vectors included in the sixth feature sequence are successively first (D+G) first feature vectors in the first feature sequence.

In an optional implementation, the processor is configured to: when a difference between the $G^{th}$ probability and a $(G-1)^{th}$ probability in the anomaly probability sequence is greater than a probability threshold, determine that signaling in a first signaling interval is abnormal, where the first signaling interval includes a $(G+D-1)^{th}$ piece of signaling to an $N^{th}$ piece of signaling in the N pieces of signaling, and G is an integer greater than 1; when each probability in the anomaly probability sequence is not less than a previous probability, determine that signaling in a second signaling interval is abnormal, where the second signaling interval includes a $(P+D)^{th}$ piece of signaling to the $N^{th}$ piece of signaling in the N pieces of signaling, a difference between a $P^{th}$ probability and a $(P+1)^{th}$ probability in the anomaly probability sequence is not less than a difference between any two adjacent probabilities in the anomaly probability sequence, and P is an integer greater than 0; when a probability in the anomaly probability sequence increases from a first value to a second value and decreases from a third value to the first value before the second value is maintained, determine that signaling in a third signaling interval is abnormal, where the first value is less than a first threshold, the second value and the third value are both greater than a second threshold, the first threshold is less than the second threshold, the third signaling interval includes a $(Q+D)^{th}$ piece of signaling to the $N^{th}$ piece of signaling in the N pieces of signaling, a $Q^{th}$ probability in the anomaly probability sequence is a probability at a start point of a final rise section in an anomaly probability curve, and Q is an integer greater than 0; and when each probability in the anomaly probability sequence is not less than the probability threshold, determine that signaling in a fourth signaling interval is abnormal, where the fourth signaling interval includes a $D^{th}$ piece of signaling to the $N^{th}$ piece of signaling in the N pieces of signaling.

In an optional implementation, the processor is further configured to: collect signaling data, where the signaling data includes the N pieces of signaling; parse each piece of signaling in the signaling data, to obtain an interface, a timestamp, a protocol, and a flow identifier corresponding to each piece of signaling; divide signaling corresponding to the same interface, protocol, and flow identifier in the signaling data into the same group, to obtain at least one group of signaling; and sort signaling in a target group of signaling according to an order of timestamps included in signaling in the target group of signaling, to obtain the to-be-detected signaling flow, where the target group of signaling is any group of signaling in the at least one group of signaling.

According to a seventh aspect, an embodiment provides a training apparatus. The apparatus includes a processor and a memory. The memory is configured to store program instructions. The processor is configured to invoke the program instructions to perform the following operations: separately performing feature construction on a message type and an information element that are included in each piece of signaling in a signaling training flow to obtain a first vector sequence, where a feature vector in the first vector sequence is in a one-to-one correspondence with signaling in the signaling training flow; and using an $R^{th}$ feature vector to an $(R+W)^{th}$ feature vector in the first vector sequence as a first training feature sequence, inputting the first training feature sequence to a first training model to implement unsupervised learning, and obtaining a first signaling anomaly detection model, where the first training model is a W-gram language model, W is an integer greater than 1, and R and S are both integers greater than 0.

According to an eighth aspect, an embodiment provides a training apparatus. The apparatus includes a processor and a memory. The memory is configured to store program instructions. The processor is configured to invoke the program instructions to perform the following operations: separately performing feature construction on a message type included in each piece of signaling in a signaling training flow to obtain a second vector sequence, where a feature vector in the second vector sequence is in a one-to-one correspondence with signaling in the signaling training flow; and using an $R^{th}$ feature vector to an $(R+W)^{th}$ feature vector in the second vector sequence as a second training feature sequence, inputting the second training feature sequence to a second training model to implement unsupervised learning, and obtaining a second signaling anomaly detection model, where the second training model is a W-gram language model, W is an integer greater than 1, and R and S are both integers greater than 0.

According to a ninth aspect, an embodiment provides a training apparatus. The apparatus includes a processor and a memory. The memory is configured to store program instructions. The processor is configured to invoke the program instructions to perform the following operations: separately performing feature construction on a message type and an information element that are included in each piece of signaling in a signaling training flow to obtain a first training sample, where a feature vector in the first training sample is in a one-to-one correspondence with signaling in the signaling training flow; inputting the first training sample and first annotation information to a third training model, and performing anomaly detection processing to obtain a first anomaly detection processing result, where the first anomaly detection processing result indicates that the first training sample is a normal signaling flow or an abnormal signaling flow; determining, based on the first anomaly detection processing result and a first standard result, a loss corresponding to the first training sample, where the first standard result is a real result that is of the first training sample and that is indicated by the first annotation information; and updating a parameter of the third training model by using an optimization algorithm based on the loss corresponding to the first training sample, and obtaining a first signaling anomaly detection model.

According to a tenth aspect, an embodiment provides a training apparatus. The apparatus includes a processor and a memory. The memory is configured to store program instructions. The processor is configured to invoke the program instructions to perform the following operations: separately performing feature construction on a message type included in each piece of signaling in a signaling training flow to obtain a second training sample, where a feature vector in the second training sample is in a one-to-one correspondence with signaling in the signaling training flow; inputting the second training sample and second annotation information to a fourth training model, and performing anomaly detection processing to obtain a second anomaly detection processing result, where the second anomaly detection processing result indicates that the second training sample is a normal signaling flow or an abnormal signaling flow; determining, based on the second anomaly detection processing result and a second standard result, a loss corresponding to the first training sample, where the second standard result is a real result that is of the second training sample and that is indicated by the second annotation information; and updating a parameter of the fourth training model by using an optimization algorithm based on a loss corresponding to the second training sample, and obtaining a second signaling anomaly detection model.

According to an eleventh aspect, an embodiment provides a computer-readable storage medium. The computer storage medium stores a computer program. The computer program includes program instructions. When the program instructions are executed by a processor, the processor is enabled to perform the method according to any one of the first aspect to the fifth aspect, and the optional implementations.

According to a twelfth aspect, an embodiment provides a computer program product. The computer program product includes program instructions. When the program instructions are executed by a processor, the processor is enabled to perform the method according to any one of the first aspect to the fifth aspect, and the optional implementations.

BRIEF DESCRIPTION OF DRAWINGS

FIG. 6 is a schematic diagram of feature construction according to an embodiment of this application;

FIG. 7 is a flowchart of another signaling anomaly detecting method according to an embodiment of this application;

DESCRIPTION OF EMBODIMENTS

Figure 1A:
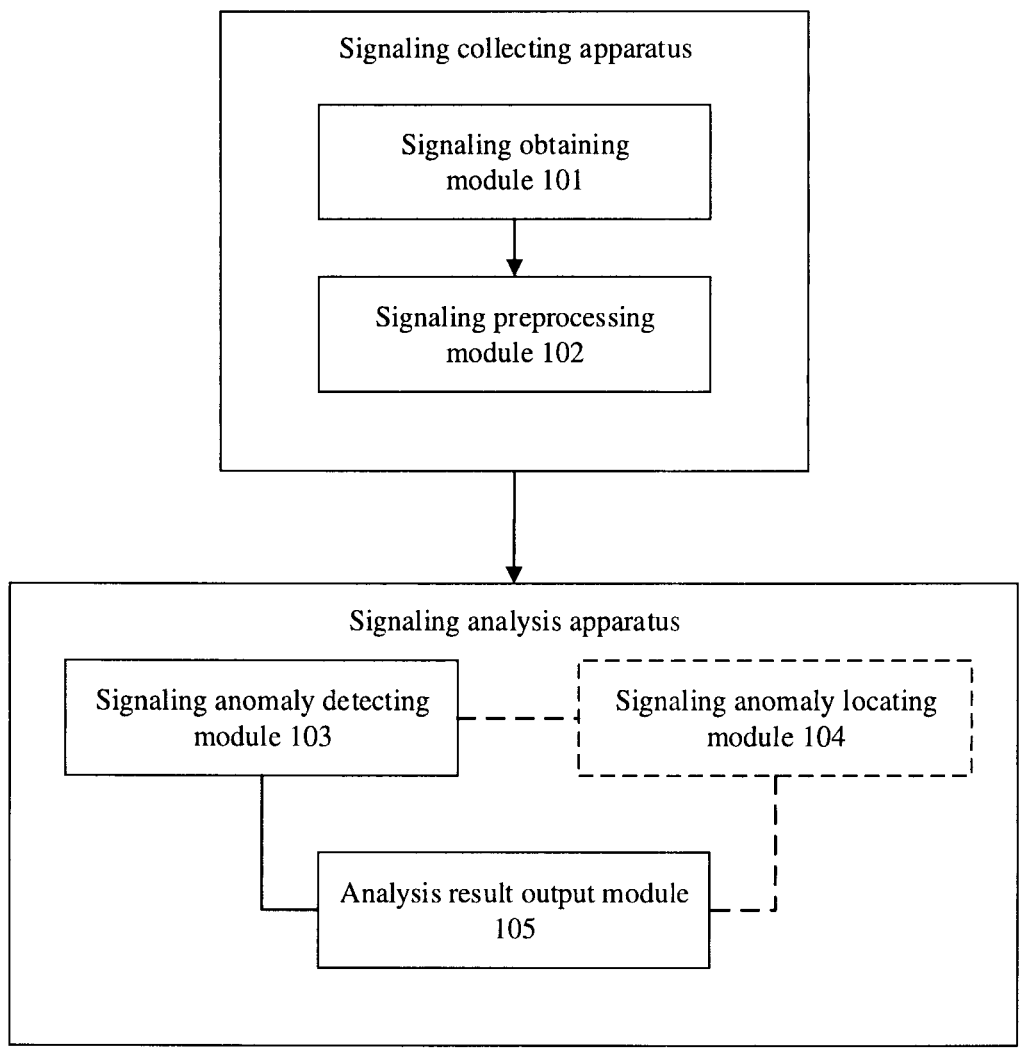
FIG. 1A is a schematic diagram of network architecture of a signaling analysis system according to an embodiment of this application.

In the embodiments, the claims, and the accompanying drawings of this application, the terms "first", "second", "third", and the like are intended to distinguish between similar objects, but do not necessarily indicate a specific order or sequence. Moreover, the terms "include", "have", and any other variant thereof are intended to cover a non-exclusive inclusion, for example, including a series of steps or units. Methods, systems, products, or devices are not necessarily limited to those explicitly listed steps or units, but may include other steps or units that are not explicitly listed or that are inherent to such processes, methods, products, or devices. The term "and/or" is used to indicate selecting one or both of two objects connected by the term. For example, "A and/or B" represents A, B, or A+B. The following first describes some terms used in this application.

Flow: A control flow that is transmitted between devices in a communication network and that includes signaling messages for controlling service functions such as calling, bearing, and connecting is referred to as a signaling flow.

Domain: A domain usually indicates logical division of basic resources of an information technology (Information Technology, IT), and is used to plan and manage the basic resources. Different domains correspond to different services and different communication protocols.

Interface: An interface is a boundary between two systems in a communication network, and is defined by a specific protocol or specification, to ensure compatibility of formats, functions, signals, and interconnections at the boundary.

Information element: An information element is an information unit carried in a signaling message. A meaning of the information element is defined by a protocol followed by specific signaling. The information element is encapsulated into a signaling message in a manner defined by the protocol. Specific content is, for example, a service type indication, a bearer setup parameter, and a user identifier.

Coarse-Fine: Coarse-fine is a common hierarchical analysis method of first a coarse level (Coarse-level) and then a fine level (Fine-level).

Control plane signaling: Control plane signaling usually indicates control signaling data that is used to set up a service for a user in a communication network.

A current signaling analysis method and a current signaling analysis apparatus can meet only an application requirement in a specific signaling protocol, and cannot be multiplexed between different protocols. Fault signaling analysis in the communication network often involves a plurality of different protocols in a plurality of domains. In consideration of this, currently, a common solution is to customize corresponding signaling analysis apparatuses for different protocols. This manner may cause resource waste and cause maintenance difficulty. In addition, it is difficult for these signaling analysis methods and apparatuses to fully cover anomalies caused due to information element errors. Therefore, the signaling anomaly analysis has incomplete coverage. Under this background, this application proposes a data-driven intelligent signaling analysis method and apparatus applicable to all signaling protocols on a control plane of the communication network. The method and the apparatus can greatly improve signaling data analysis efficiency, reduce the costs of the analysis, and generate great application values in the operation and maintenance field.

The signaling analysis method provided in this embodiment can be applied to scenarios such as signaling anomaly detection and signaling anomaly locating. The following separately briefly describes application of the signaling analysis method provided in this embodiment of this application in a signaling anomaly detection scenario and a signaling anomaly locating scenario.

In the signaling anomaly detection scenario, the signaling analysis apparatus performs anomaly detection in real time on signaling data collected from the communication network, and outputs a corresponding anomaly detection result after detecting any abnormal signaling flow, so that the operation and maintenance personnel learns of the abnormal signaling flow in time. In other words, the signaling analysis apparatus may analyze in real time whether there is an abnormal signaling flow. When detecting the abnormal signaling flow, the signaling analysis apparatus sends an anomaly detection result to the operation and maintenance personnel, so that the operation and maintenance personnel learns of the abnormal signaling flow in time.

In the signaling anomaly locating scenario, the signaling analysis apparatus performs anomaly detection in real time on signaling data collected from the communication network. After detecting any abnormal signaling flow, the signaling analysis apparatus further determines an abnormal signaling interval in the signaling flow, and sends, to the operation and maintenance personnel, information indicating that signaling in the signaling interval is abnormal, to facilitate the operation and maintenance personnel to specifically resolve a signaling anomaly problem.

FIG. 1A is a schematic diagram of network architecture of a signaling analysis system according to an embodiment of this application. As shown in FIG. 1A, the signaling analysis system includes a signaling collection apparatus and a signaling analysis apparatus. The signaling collection apparatus includes a signaling obtaining module 101 and a signaling preprocessing module 102. The signaling analysis apparatus includes a signaling anomaly detecting module 103, a signaling anomaly locating module 104, and an analysis result output module 105. The signaling anomaly locating module 104 is optional. In other words, the signaling analysis apparatus may not include the signaling anomaly locating module 104. The signaling collection apparatus is configured to: collect signaling data from a communication network; extract a to-be-detected signaling flow from the collected signaling data, and send the to-be-detected signaling flow to the signaling analysis apparatus. The signaling analysis apparatus is configured to implement signaling anomaly detection and signaling anomaly locating (that is, determine an abnormal signaling interval). Functions of these modules are described in detail in the following.

Figure 1B:
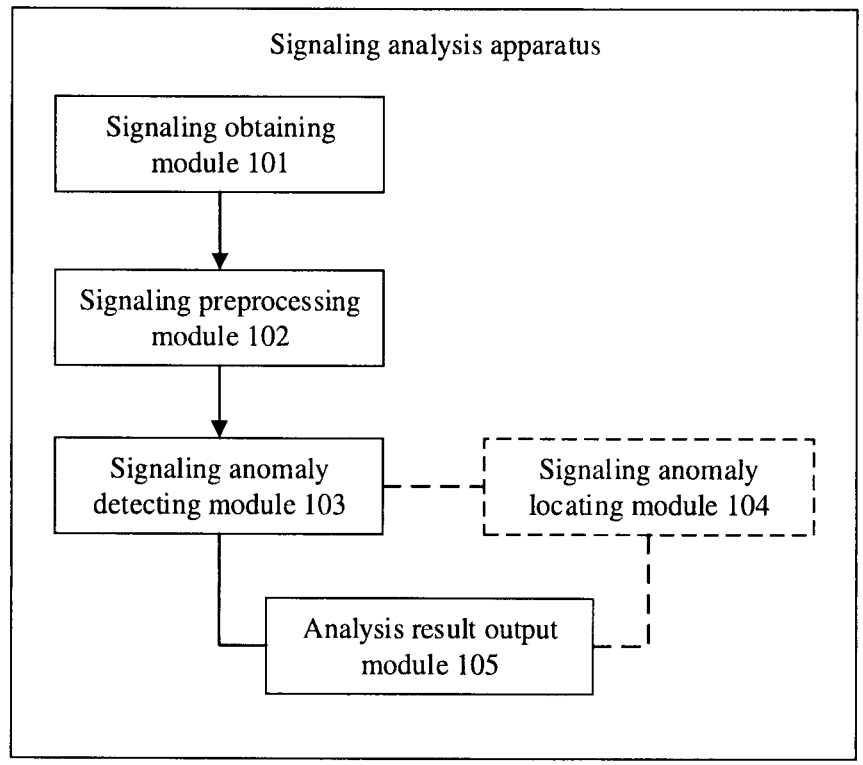
FIG. 1B is a schematic diagram of a signaling analysis apparatus according to an embodiment of this application.

FIG. 1B is a schematic diagram of a signaling analysis apparatus according to an embodiment of this application. As shown in FIG. 1B, the signaling analysis apparatus includes a signaling obtaining module 101 and a signaling preprocessing module 102, a signaling anomaly detecting module 103, a signaling anomaly locating module 104, and an analysis result output module 105. The signaling anomaly locating module 104 is optional. It may be learned from comparison between FIG. 1A and FIG. 1B that the signaling analysis apparatus may independently implement signaling anomaly detection, or may cooperate with another apparatus to implement signaling anomaly detection. It should be understood that the signaling analysis apparatus in FIG. 1A and that in FIG. 1B are two optional implementations. The following describes the modules in FIG. 1A and FIG. 1B.

The signaling obtaining module 101 is configured to complete collection of to-be-analyzed signaling data in the communication network, that is, collect signaling data.

The signaling preprocessing module 102 is configured to: for the obtained signaling data, first parse out information related to signaling analysis, and then extract the to-be-detected signaling flow by using a signaling flow as a unit.

The signaling anomaly detecting module 103 is configured to implement efficient and accurate coarse-fine signaling anomaly detection through analyzing a message type and message content of signaling. Two anomaly detecting manners: a supervised anomaly detecting manner and an unsupervised anomaly detecting manner are separately provided based on an annotation status of training data.

The signaling anomaly locating module 104 is configured to implement an explainable signaling anomaly locating manner for an abnormal signaling flow detected by the signaling anomaly detecting module 103. Two anomaly locating manners: a supervised anomaly locating manner and an unsupervised anomaly locating manner are separately provided based on an annotation status of training data.

The analysis result output module 105 is configured to sort out and output a result of the signaling anomaly detecting module 103 and a result of the signaling anomaly locating module 104.

The following describes implementations of these modules in detail. Details are not described herein.

Figure 2:
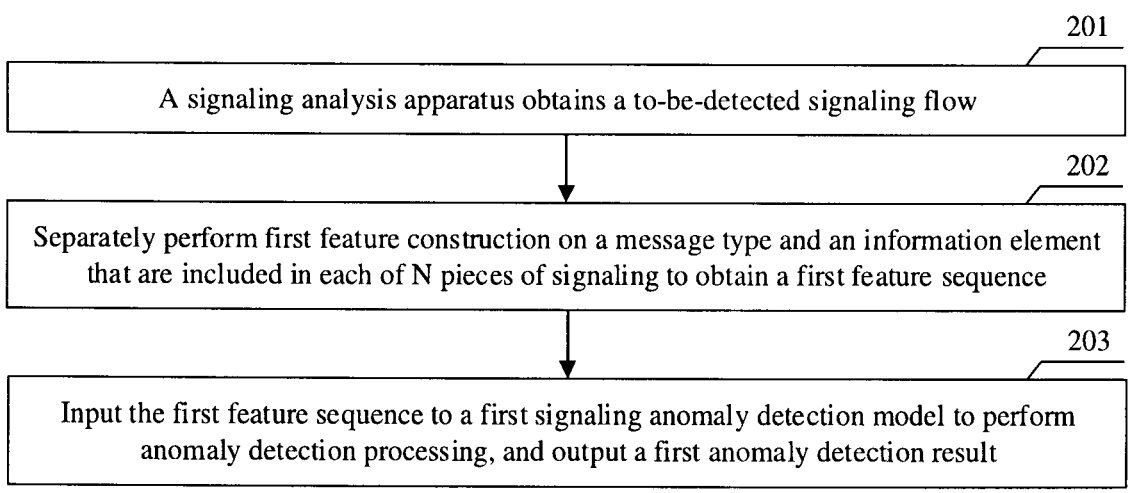
FIG. 2 is a flowchart of a signaling analysis method according to an embodiment of this application.

FIG. 2 is a flowchart of a signaling analysis method according to an embodiment of this application. As shown in FIG. 2, the method may include the following steps:

201: A signaling analysis apparatus obtains a to-be-detected signaling flow.

The to-be-detected signaling flow includes N pieces of signaling. Any one of the N pieces of signaling includes a message type and an information element. Herein, N is an integer greater than 1. The signaling analysis apparatus may be a device with a data processing function, for example, a server, a computer, or a cloud network element. Optionally, signaling in the to-be-detected signaling flow corresponds to the same protocol and the same interface. Optionally, a signaling obtaining module 101 and a signaling preprocessing module 102 in the signaling analysis apparatus implement step 201.

In some embodiments, before performing step 201, the signaling analysis apparatus may perform the following operations: collecting signaling data, where the signaling data includes the N pieces of signaling; parsing each piece of signaling in the signaling data, to obtain an interface, a timestamp, a protocol, and a flow identifier corresponding to each piece of signaling; dividing signaling corresponding to the same interface, protocol, and flow identifier in the signaling data into the same group, to obtain at least one group of signaling; and sorting signaling in a target group of signaling according to an order of timestamps included in signaling in the target group of signaling, to obtain the to-be-detected signaling flow, where the target group of signaling is any group of signaling in the at least one group of signaling.

202: Separately perform first feature construction on a message type and an information element that are included in each of the N pieces of signaling to obtain a first feature sequence.

The first feature sequence includes N first feature vectors. The N first feature vectors are in a one-to-one correspondence with the N pieces of signaling. In some embodiments, step 202 may be replaced with separately performing first feature construction on each information element included in each of the N pieces of signaling to obtain a first feature sequence. The following describes in detail an implementation of performing feature construction on a message type and an information element that are included in signaling to obtain a feature vector.

203: Input the first feature sequence to a first signaling anomaly detection model to perform anomaly detection processing, and output a first anomaly detection result.

The first anomaly detection result indicates that the to-be-detected signaling flow is normal or abnormal. The first signaling anomaly detection model may be a model obtained through unsupervised learning, or may be a model obtained through supervised learning. Optionally, the signaling analysis apparatus performs step 202 and step 203 by using a signaling anomaly detecting module 103. Optionally, when the first anomaly detection result indicates that the to-be-detected signaling flow is abnormal, the first anomaly detection result is sent to the operation and maintenance personnel, so that the operation and maintenance personnel learns an abnormal signaling flow.

The method provided in this embodiment can cover an anomaly caused due to a message type and an information element error, and can be multiplexed between different protocols.

To improve detection efficiency when accuracy of anomaly detection is ensured, the signaling analysis apparatus may first perform a first round of coarse-level anomaly detection based on a message type by using the signaling anomaly detecting module 103, and then perform a second round of fine-level anomaly detection based on a message type and an information element if no anomaly is detected in the first round of detection. In an optional implementation, before performing step 202, the signaling analysis apparatus performs the following operations: separately performing second feature construction on the N pieces of signaling to obtain a second feature sequence; and inputting the second feature sequence to a second signaling anomaly detection model to perform anomaly detection processing, and obtaining a second anomaly detection result. The second anomaly detection result indicates that the to-be-detected signaling flow is normal or abnormal. The signaling analysis apparatus may perform step 203 when the second anomaly detection result indicates that the to-be-detected signaling flow is normal. The second feature sequence includes N second feature vectors. The N second feature vectors are in a one-to-one correspondence with the N pieces of signaling. A reference feature vector in the N second feature vectors is obtained through performing feature construction on a message type included in signaling corresponding to the reference feature vector. The reference feature vector is any one of the N second feature vectors.

In this implementation, the first round of coarse-level anomaly detection may be used to improve detection efficiency when a recall rate is ensured and accuracy is relatively high, and the second round of fine-level anomaly detection may be used to further improve an overall recall rate.

FIG. 2 describes only a method procedure in which the signaling analysis apparatus implements signaling anomaly detection. In some embodiments, after detecting that the to-be-detected signaling flow is abnormal, the signaling analysis apparatus may further determine an anomaly location, that is, an abnormal signaling interval in the to-be-detected signaling flow. Optionally, the signaling analysis apparatus may determine the anomaly location in the to-be-detected signaling flow by using a signaling anomaly locating module 104. In some embodiments, the signaling analysis apparatus may include an unsupervised signaling anomaly detecting module 201, a supervised signaling anomaly detecting module 202, an unsupervised signaling anomaly locating module 203, and a supervised signaling anomaly locating module 204. In other words, in some embodiments, the signaling anomaly detecting module 103 may include the unsupervised signaling anomaly detecting module 201 and the supervised signaling anomaly detecting module 202; and the signaling anomaly locating module 104 may include the unsupervised signaling anomaly locating module 203 and the supervised signaling anomaly locating module 204.

The following describes an embodiment in which the signaling analysis apparatus performs signaling anomaly locating after detecting that the to-be-detected signaling flow is abnormal.

Figure 3:
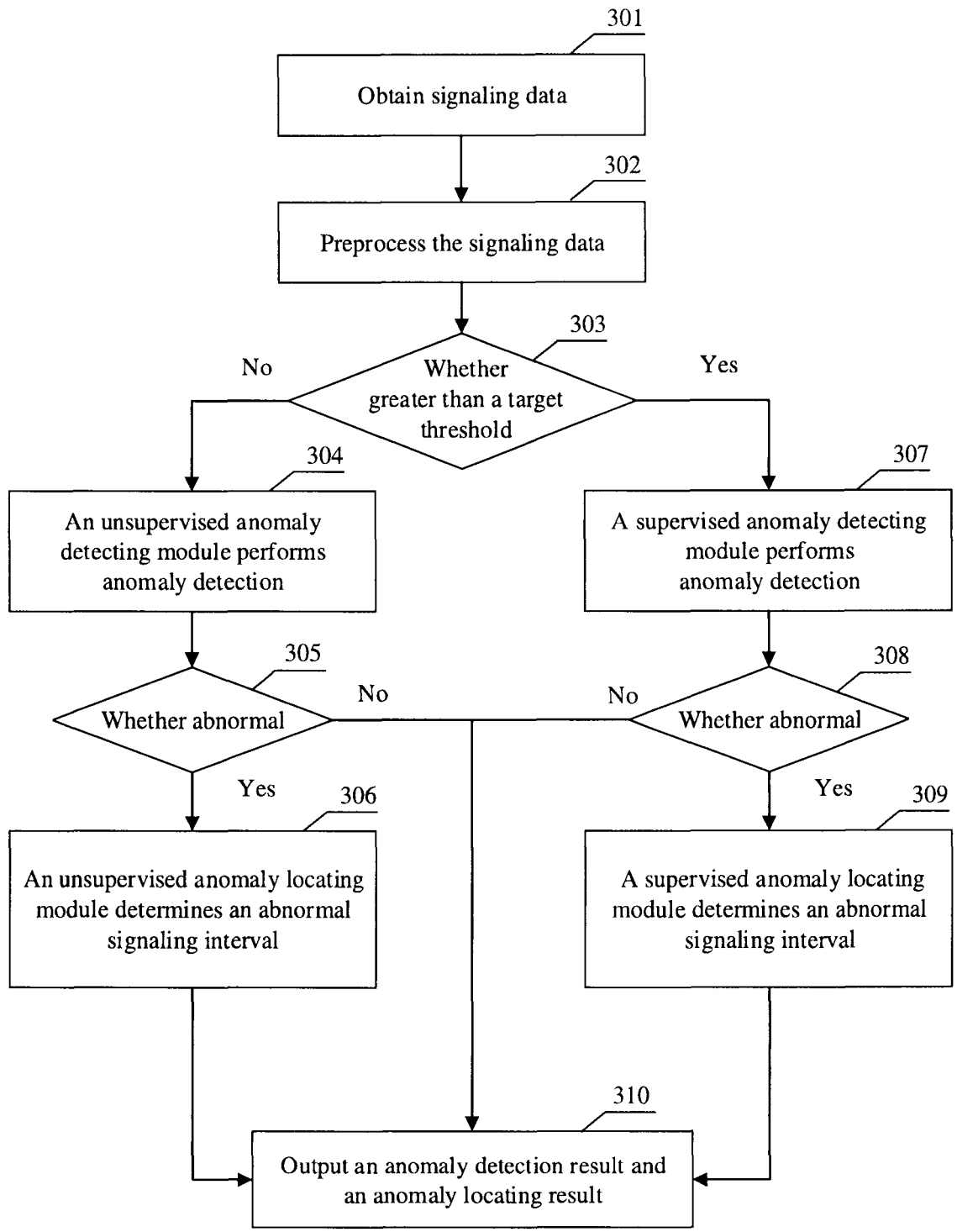
FIG. 3 is a flowchart of a signaling anomaly locating method according to an embodiment of this application.

FIG. 3 is a flowchart of a signaling anomaly locating method according to an embodiment of this application. As shown in FIG. 3, the method includes the following steps:

301: The signaling analysis apparatus obtains signaling data.

Optionally, the signaling obtaining module 101 in the signaling analysis apparatus obtains the to-be-analyzed signaling data in a communication network. In some embodiments, the signaling obtaining module 101 collects the signaling data from the communication network by using a signaling collection tool, a network packet capturing tool, or a dedicated signaling instrument released by a device vendor. The collected signaling data may be signaling data in an interactive control type from but not limited to a wireless domain, a circuit switched (Circuit Switched) domain, a packet switched (Packet Switched) domain, an IP multimedia subsystem (IP Multimedia Subsystem, IMS) domain.

302: The signaling analysis apparatus preprocesses the signaling data to obtain a to-be-detected signaling flow.

Optionally, the signaling preprocessing module 102 in the signaling analysis apparatus preprocesses the signaling data to obtain the to-be-detected signaling flow. The following describes in detail an implementation of step 302. The to-be-detected signaling flow includes N pieces of signaling. The N pieces of signaling all belong to the same signaling flow. Any one of the N pieces of signaling includes a message type and an information element. Herein, N is an integer greater than 1. In some embodiments, the signaling preprocessing module 102 may first parse the signaling data to obtain a protocol, an interface, a timestamp, a flow identifier, a message type, and message content related to signaling analysis; and then extract the to-be-detected signaling flow based on the protocol, the interface, the timestamp, and the flow identifier.

303: The signaling analysis apparatus determines whether accuracy that the supervised signaling anomaly detecting module 202 performs anomaly detection on the to-be-detected signaling flow is higher than a target threshold.

If the accuracy that the supervised signaling anomaly detecting module 202 performs anomaly detection on the to-be-detected signaling flow is higher than the target threshold, step 307 is performed. If the accuracy that the supervised signaling anomaly detecting module 202 performs anomaly detection on the to-be-detected signaling flow is not higher than the target threshold, step 304 is performed. The target threshold may be 80%, 90%, 95%, or the like. In some embodiments, the signaling analysis apparatus may store the accuracy that the supervised signaling anomaly detecting module 202 performs anomaly detection on the to-be-detected signaling flow. It may be understood that if the accuracy that the supervised signaling anomaly detecting module 202 performs anomaly detection on the to-be-detected signaling flow is less than the target threshold, the unsupervised signaling anomaly detecting module 201 is used to perform anomaly detection on the to-be-detected signaling flow. Otherwise, the supervised signaling anomaly detecting module 202 is used to perform anomaly detection on the to-be-detected signaling flow. In actual application, the signaling analysis apparatus may store accuracy that the supervised signaling anomaly detecting module 202 performs anomaly detection on each signaling flow.

304: The signaling analysis apparatus performs anomaly detection on the to-be-detected signaling flow by using the unsupervised signaling anomaly detecting module 201.

Optionally, the unsupervised signaling anomaly detecting module 201 first performs a first round of anomaly detection based on message types of signaling in the to-be-detected signaling flow, and then performs a second round of anomaly detection based on message types and information elements of signaling in the to-be-detected signaling flow. The following further describes in detail an implementation of step 304.

305: The signaling analysis apparatus determines whether the unsupervised signaling anomaly detecting module 201 detects that the to-be-detected signaling flow is abnormal.

If the unsupervised signaling anomaly detecting module 201 detects that the to-be-detected signaling flow is abnormal, step 306 is performed. If the unsupervised signaling anomaly detecting module 201 detects that the to-be-detected signaling flow is not abnormal, step 310 is performed.

306: The signaling analysis apparatus determines an anomaly location in the to-be-detected signaling flow by using the unsupervised signaling anomaly locating module 203.

307: The signaling analysis apparatus performs anomaly detection on the to-be-detected signaling flow by using the supervised signaling anomaly detecting module 202.

Optionally, the supervised signaling anomaly detecting module 202 first performs a first round of anomaly detection based on message types of signaling in the to-be-detected signaling flow, and then performs a second round of anomaly detection based on message content of signaling in the to-be-detected signaling flow. The following further describes in detail an implementation of step 307. The message content of each piece of signaling includes at least one information element.

308: The signaling analysis apparatus determines whether the supervised signaling anomaly detecting module 202 detects that the to-be-detected signaling flow is abnormal.

If the supervised signaling anomaly detecting module 202 detects that the to-be-detected signaling flow is abnormal, step 309 is performed. If the supervised signaling anomaly detecting module 202 detects that the to-be-detected signaling flow is not abnormal, step 310 is performed.

309: The signaling analysis apparatus determines an anomaly location in the to-be-detected signaling flow by using the supervised signaling anomaly locating module 204.

310: The signaling analysis apparatus outputs an anomaly detection result and an anomaly locating result.

Optionally, when the to-be-detected signaling flow is normal, an analysis result output module 105 of the signaling analysis apparatus outputs information indicating that the to-be-detected signaling flow is normal. When the to-be-detected signaling flow is abnormal, the analysis result output module 105 outputs an abnormal signaling interval or a signaling anomaly location in the to-be-detected signaling flow.

In some embodiments, the signaling analysis apparatus may include the unsupervised signaling anomaly detecting module 201 (that is, the signaling anomaly detecting module 103) and the unsupervised signaling anomaly locating module 203 (that is, the signaling anomaly locating module 104); but not include the supervised signaling anomaly detecting module 202 and the supervised signaling anomaly locating module 204. In this embodiment, the signaling analysis apparatus may perform step 301, step 302, step 304, step 305, step 306, and step 310 in FIG. 3.

In some embodiments, the signaling analysis apparatus may include the supervised signaling anomaly detecting module 202 (that is, the signaling anomaly detecting module 103) and the supervised signaling anomaly locating module 204 (that is, the signaling anomaly locating module 104); but not include the unsupervised signaling anomaly detecting module 201 and the unsupervised signaling anomaly locating module 203. In this embodiment, the signaling analysis apparatus may perform step 301, step 302, step 307, step 308, step 309, and step 310 in FIG. 3.

The following separately describes functions and implementations of the related modules in more detail.

Figure 4:
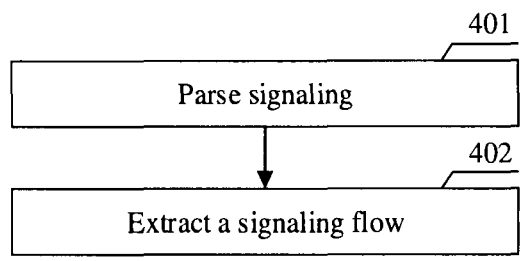
FIG. 4 is a flowchart of a signaling data pre-processing method according to an embodiment of this application.

The signaling preprocessing module 102 is configured to preprocess the signaling data to obtain the to-be-detected signaling flow. As shown in FIG. 4, steps performed by the signaling preprocessing module 102 are as follows: 401: Parse signaling. 402: Extract a signaling flow. Parsing the signaling may be parsing out information related to signaling analysis for each piece of signaling in the signaling data, for example, a protocol, an interface, a timestamp, and a flow identifier. Extracting the signaling flow may be extracting the to-be-detected signaling flow by using a signaling flow as a unit for subsequent signaling analysis. For example, the signaling preprocessing module may complete signaling parsing by using a signaling parsing tool, and complete the signaling flow extraction based on the information such as a protocol, an interface, a timestamp, and a flow identifier of each piece of signaling.

In the step 401 of parsing the signaling, the signaling preprocessing module may parse each piece of signaling to obtain a plurality of types of information related to signaling analysis, to reduce a difference of signaling data between different protocols, for example, a signaling message in the S1AP protocol is in a binary form, and a signaling message in the SIP protocol is in a hypertext markup language (HyperText Markup Language, HTML) form, and to improve readability of signaling data. Table 1 shows a plurality of types of information related to signaling analysis. It should be understood that the information in Table 1 is merely an example, and the information that is related to signaling analysis and that is obtained by the signaling preprocessing module through parsing is not limited to Table 1. The timestamp may be a time identifier for sending/receiving the signaling message, and is not limited to absolute specific time (for example, 2018/07/10 15:38:10.031) or a relative time count value (for example, 1122867) on a communication device.

TABLE 1

| Name | Description |
| --- | --- |
| Protocol | Signaling communication protocol to which the signaling message belongs, for example, the SIP or the S1AP |

TABLE 1-continued

| Name | Description |
| --- | --- |
| Interface | Interface in which the signaling message is generated, for example, S11 or S5 |
| Timestamp | Specific time (in microseconds) at which the signaling message occurs, for example, 2018/07/10 15:38:10.031 |
| Flow identifier | Unique identifier for determining a flow to which the signaling message belongs, where the identifier may be a separate field in the signaling message or may be formed through splicing fields in several signaling messages |
| Message type | Type of the signaling message, which may be considered as a brief description for the message, for example, an RRC_CONN_REQ or a Session Request |
| Message content | Specific content of the signaling message, which describes in detail specific values of a series of information elements in this message, where information of each information element is represented in a key value pair form (information element name-information element value) |

In the step 402 of extracting the signaling flow, because the signaling data analysis is related to context, the signaling preprocessing module may first group all parsed signaling based on information such as a protocol, an interface, and a flow identifier corresponding to each piece of signaling, and then sort signaling according to an order of timestamps included in signaling in each group of signaling, to obtain the final to-be-detected signaling flow. The signaling in each group of signaling corresponds to the same flow identifier and the same protocol. Therefore, each group of signaling belongs to the same signaling flow. For example, the signaling preprocessing module groups all the parsed signaling based on the information such as a protocol, an interface, and a flow identifier corresponding to each piece of signaling to obtain five groups of signaling, and then sorts signaling in each group of signaling according to an order of timestamps included in the signaling in each group of signaling, to obtain five to-be-detected signaling flows.

Figure 5:
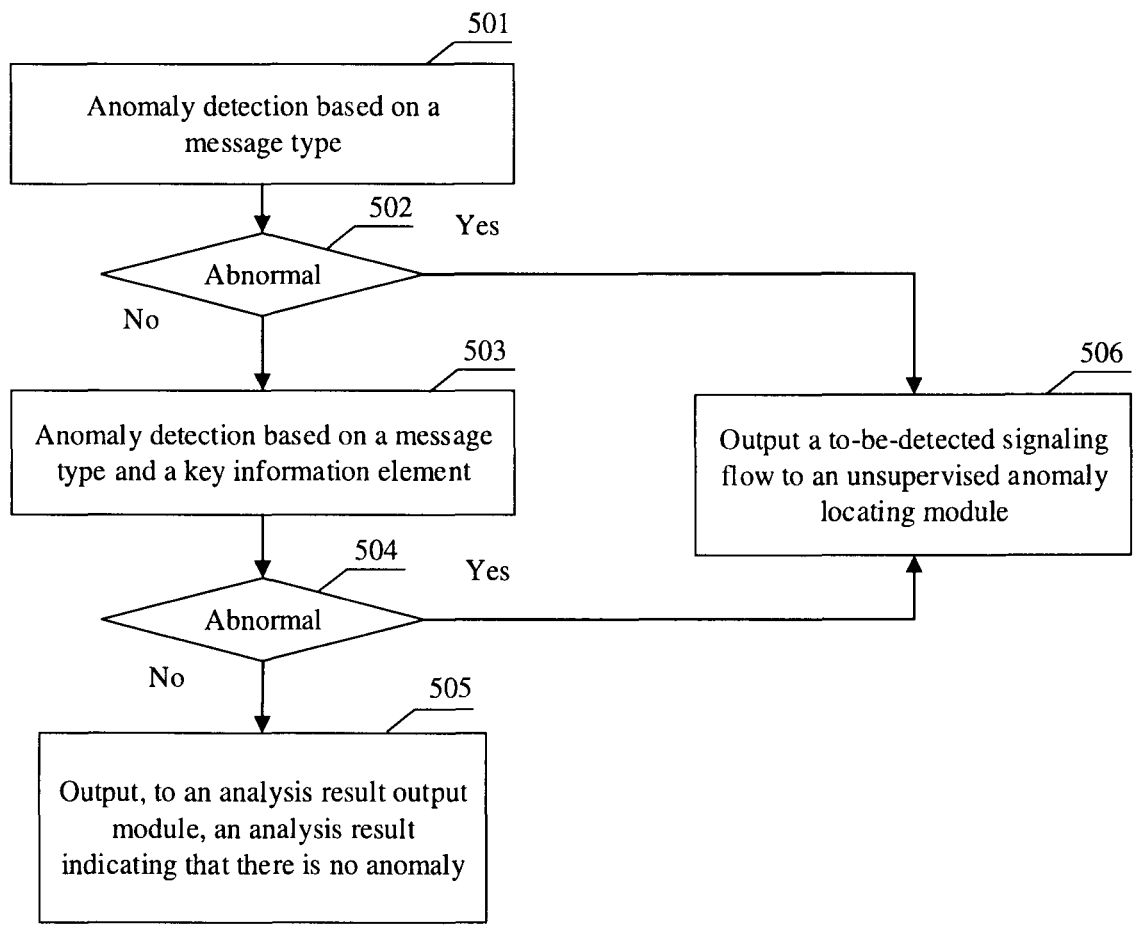
FIG. 5 is a flowchart of a signaling anomaly detecting method according to an embodiment of this application.

The unsupervised signaling anomaly detecting module 201 is configured to detect whether the to-be-detected signaling flow is abnormal. When there is insufficient annotated signaling data used for model training, the signaling analysis apparatus may perform model training and anomaly detection by using the unsupervised anomaly detecting module. As shown in FIG. 5, the unsupervised anomaly detecting module may perform the following operations:

501: The unsupervised signaling anomaly detecting module performs a first round of coarse-level anomaly detection on the to-be-detected signaling flow based on a message type.

502: The unsupervised signaling anomaly detecting module determines whether the to-be-detected signaling flow is abnormal.

If the to-be-detected signaling flow is abnormal, step 506 is performed. If the to-be-detected signaling flow is not abnormal, step 503 is performed. Optionally, the unsupervised signaling anomaly detecting module determines based on an anomaly detection result obtained in step 501 whether the to-be-detected signaling flow is abnormal.

503: The unsupervised signaling anomaly detecting module performs a second round of fine-level anomaly detection on the to-be-detected signaling flow based on a message type and a key information element in message content.

504: The unsupervised signaling anomaly detecting module determines whether the to-be-detected signaling flow is abnormal.

If the to-be-detected signaling flow is abnormal, step 506 is performed. If the to-be-detected signaling flow is not abnormal, step 505 is performed. Optionally, the unsupervised signaling anomaly detecting module determines based on an anomaly detection result obtained in step 503 whether the to-be-detected signaling flow is abnormal.

505: The unsupervised signaling anomaly detecting module outputs, to the analysis result output module, the analysis result indicating that there is no anomaly.

The analysis result indicating that there is no anomaly indicates that the to-be-detected signaling flow is normal.

506: The unsupervised signaling anomaly detecting module outputs the to-be-detected signaling flow to the unsupervised anomaly locating module.

To improve anomaly detection efficiency when accuracy of anomaly detection is ensured, the unsupervised signaling anomaly detecting module 201 may first perform a first round of coarse-level anomaly detection based on message type information, and then perform a second round of fine-level anomaly detection based on a message type and a key information element (corresponding to the target information element) in message content if no anomaly is detected in the first round of detection. The key information element may include an information element that indicates a sending cause of signaling in the message content. When an anomaly is detected in any round of detection, the abnormal to-be-detected signaling flow may be directly output to the unsupervised signaling anomaly locating module 203 for anomaly locating. Otherwise, the analysis result indicating that there is no anomaly may be directly output to the analysis result output module 105. The first round of anomaly detection of the unsupervised signaling anomaly detecting module 201 may be used to improve detection efficiency when a recall rate is ensured and accuracy is relatively high, and the second round of fine-level anomaly detection may be used to further improve an overall recall rate.

Because signaling interaction between network elements in the communication network is similar to interactive dialogue of people in life, signaling generated at a latest moment is based on signaling generated at a previous moment of the latest moment, that is, a response to historical signaling. Therefore, an optional solution implemented by the unsupervised anomaly detecting module is: setting up a signaling anomaly detection model (corresponding to the first signaling anomaly detection model and the second signaling anomaly detection model) based on normal signaling data by using an NLP technology, determining whether a to-be-detected signaling message is in a predicted signaling range, and performing anomaly detection. The normal signaling data indicates a signaling flow with no anomaly. The following describes in detail an implementation in which the unsupervised anomaly detecting module performs anomaly detection, that is, implementations of step 501 and step 503.

In the anomaly detection based on the message type, after receiving the parsed to-be-detected signaling flow, the unsupervised anomaly detecting module may first sequentially perform feature construction on the message types of the signaling in the to-be-detected flow, to obtain a message type feature sequence (corresponding to the second feature sequence) corresponding to the to-be-detected flow. Then, the unsupervised anomaly detecting module performs the coarse-level anomaly detection on the to-be-detected signaling feature sequence by using a signaling anomaly detection model A (corresponding to the second signaling anomaly detection model) based on the message type.

In the first round of feature construction, a message type of each piece of signaling is used as a word in an NLP algorithm, and feature construction is performed by using a feature construction method for a word in the NLP. The feature construction method for a word includes but is not limited to one-hot encoding and bag of words encoding. The unsupervised anomaly detecting module sequentially performs feature construction on the message types of the signaling in the to-be-detected flow to obtain a feature sequence. Each feature vector in the feature sequence corresponds to one message type.

In the first round of anomaly detection, for the feature sequence (that is, the message type feature sequence) obtained after the feature construction, detection is separately performed from a $1^{st}$ feature vector (corresponding to the second feature vector) in the feature sequence by using a sliding window with a window length of w and a step length of 1. Herein, w placeholders may be filled before the $1^{st}$ feature vector in the feature sequence, to predict the $1^{st}$ feature vector in the sequence. When performing anomaly detection, the unsupervised anomaly detecting module inputs a $(t-w)^{th}$ feature vector, a $(t-w+1)^{th}$ feature vector, ..., and a $(t-1)^{th}$ feature vector in the feature sequence to the signaling anomaly detection model A based on the message type, and performs anomaly detection processing, to obtain a possible message type range of a $t^{th}$ piece of signaling. Herein, w and t are both integers greater than 1. If a message type of the $t^{th}$ piece of signaling in the to-be-detected flow is not in the predicted message type range (corresponding to a second set), it may be considered that the to-be-detected signaling flow is abnormal, and the abnormal to-be-detected signaling flow is directly output to the unsupervised signaling anomaly locating module 203 for anomaly locating. Otherwise, the to-be-detected signaling flow enters the second round of anomaly detection based on the message type and the key information element. A sequence model used for the signaling anomaly detection model based on the message type may be but is not limited to an N-gram model, an NNLM, or the like.

In the anomaly detection based on the message type and the key information element, because it is relatively difficult or even unable to reflect, in the message type of the signaling, a problem that single signaling is faulty, after no anomaly is detected in the first round of anomaly detection based on the message type, the unsupervised anomaly detecting module may perform the second round of anomaly detection on the to-be-detected signaling flow based on the message type and the key information element. For message content that includes several information elements in a piece of signaling, the unsupervised anomaly detecting module may consider a cause-type information element as a key information element, and perform anomaly detection based on the message type by using an information element value of the cause-type information element in the message content. The cause-type information element indicates an information element that is in a signaling message and that can be used to explicitly indicate a reason for sending the signaling. The unsupervised anomaly detecting module may first sequentially perform feature construction on message types and key information elements of the signaling in the to-be-detected flow, to obtain the feature sequence corresponding to the to-be-detected signaling flow. Then, the unsupervised anomaly detecting module performs the fine-level anomaly detection on the feature sequence corresponding to the to-be-detected signaling flow by using a signaling anomaly detection model B (corresponding to the first signaling anomaly detection model) based on the message type and the key information element.

In the second round of feature construction, a combination of the message type and the key information element of each piece of signaling is considered as a word in an NLP algorithm, and feature construction is performed by using a feature construction method for a word in the NLP. As shown in FIG. 6, an optional combination method of a message type and a key information element is splicing a message type and an information element value of a key information element, and considering a splicing result as a new word. The feature construction method for a word includes but is not limited to One-hot encoding and BoW encoding. The unsupervised anomaly detecting module may sequentially perform feature construction on the message types and the key information elements of the signaling in the to-be-detected flow to obtain a feature sequence (corresponding to the first feature sequence). Each feature vector in the feature sequence corresponds to a combination of a message type and a key information element of one piece of signaling in the to-be-detected signaling flow.

In the second round of anomaly detection, for the feature sequence obtained after the second round of feature construction, the unsupervised anomaly detecting module separately performs detection by using a sliding window with a window length of w' and a step length of 1. For example, when performing the second round of anomaly detection, the unsupervised anomaly detecting module inputs a $(t-w)^{th}$ feature vector, a $(t-w+1)^{th}$ feature vector, ..., and a $(t-1)^{th}$ feature vector in the first feature sequence to the signaling anomaly detection model B based on the message type and the key information element, and performs anomaly detection processing, to obtain a possible combination of a message type and a key information element of a $t^{th}$ piece of signaling. When the combination of the message type and the key information element of the $t^{th}$ piece of signaling in the to-be-detected flow is not included in at least one combination (corresponding to a first set) that is of a message type and a key information element and that is obtained through prediction performed by using the signaling anomaly detection model B, it may be determined that the to-be-detected signaling flow is abnormal, and the abnormal to-be-detected signaling flow is directly output to the unsupervised anomaly locating module for anomaly locating. Otherwise, the unsupervised anomaly locating module may directly output, to the analysis result output module 105, the analysis result indicating that there is no anomaly. A sequence model used for the signaling anomaly detection model B based on the message type and the key information element may be but is not limited to an N-gram model, an NNLM, or the like.

The signaling anomaly detection model A and the signaling anomaly detection model B that are used in the anomaly detection need to be obtained based on a normal signaling training data set by using a machine learning method. The following describes a manner of obtaining the signaling anomaly detection model A and the signaling anomaly detection model B through training.

Optionally, a training method for obtaining the signaling anomaly detection model A through training is as follows: separately performing feature construction on a message type included in each piece of signaling in a signaling training flow to obtain a second vector sequence, where a feature vector in the second vector sequence is in a one-to-one correspondence with signaling in the signaling training flow; and using an $R^{th}$ feature vector to an $(R+W)^{th}$ feature vector in the second vector sequence as a second training feature sequence, inputting the second training feature sequence to a second training model to implement unsupervised learning, and obtaining a second signaling anomaly detection model, where the second training model is a W-gram model, W is an integer greater than 1, and R and S are both integers greater than 0. Before the signaling anomaly detection model A is trained, a plurality of signaling flows (that is, normal signaling flows) in which there is no anomaly in the communication network may be first obtained and then used as a data set for training the signaling anomaly detection model A. For each signaling flow in the data set, feature construction is performed on a message type in each piece of signaling, to obtain a feature sequence of each signaling flow. A 3-gram language model (3-grams) is used as an example. If a vector sequence of a message type in a signaling flow after feature construction is [a, b, c, d] (corresponding to the second vector sequence), the following feature sequence (corresponding to the second feature sequence) for training the signaling anomaly detection model A may be obtained for the signaling flow: [<bos>, <bos>, <bos>, a], [<bos>, <bos>, a, b], [<bos>, a, b, c], [a, b, c, d], and [b, c, d, <eos>]. Herein, <bos> and <eos> are respectively vectors corresponding to a placeholder and a terminator after the feature construction. The 3-gram language model is used as an example. For an input feature sequence, the model collects statistics of each conditional probability P (a fourth message in the feature sequence first three messages in the feature sequence) in all the feature sequences, to obtain a signaling anomaly detection model of the normal signaling flows.

Optionally, a training method for obtaining the signaling anomaly detection model B through training is as follows: separately performing feature construction on a message type and an information element that are included in each piece of signaling in a signaling training flow to obtain a first vector sequence, where a feature vector in the first vector sequence is in a one-to-one correspondence with signaling in the signaling training flow; and using an $R^{th}$ feature vector to an $(R+W)^{th}$ feature vector in the first vector sequence as a first training feature sequence, inputting the first training feature sequence to a first training model to implement unsupervised learning, and obtaining a first signaling anomaly detection model, where the first training model is a W-gram model, W is an integer greater than 1, and R and S are both integers greater than 0. Before the signaling anomaly detection model B is trained, a plurality of signaling flows (that is, normal signaling flows) in which there is no anomaly in the communication network may be first obtained and then used as a data set for training the signaling anomaly detection model B. For each signaling flow in the data set, feature construction is performed on a message type and a key information element in each piece of signaling, to obtain a feature sequence of each signaling flow. A 3-gram language model (3-grams) is used as an example. If a vector sequence of a message type and a key information element in a signaling flow after feature construction is [a, b, c, d] (corresponding to the first vector sequence), the feature sequence obtained for the flow is [<bos>, <bos>, <bos>, a], [<bos>, <bos>, a, b], [<bos>, a, b, c], [a, b, c, d], and [b, c, d, <eos>]. Herein, <bos> and <eos> are respectively vectors corresponding to a placeholder and a terminator after the feature construction. The 3-gram language model is used as an example. For an input feature sequence, the model collects statistics of each conditional probability P (a fourth message in the feature sequence first three messages in the feature sequence) in all the normal feature sequence, to obtain the signaling anomaly detection model B of the normal signaling flows.

The supervised signaling anomaly detecting module 202 is configured to detect whether the to-be-detected signaling flow is abnormal. As annotated signaling data gradually accumulates, when there is a large volume of annotated signaling data used for model training, the signaling analysis apparatus may perform model training and anomaly detection by using the supervised anomaly detecting module. In comparison with the unsupervised signaling anomaly detecting module, the supervised signaling anomaly detecting module has higher accuracy and a higher recall rate in anomaly detection. As shown in FIG. 7, an supervised signaling anomaly detecting module may perform the following operations:

701: The supervised signaling anomaly detecting module performs a first round of coarse-level anomaly detection on a to-be-detected signaling flow based on a message type.

702: The supervised signaling anomaly detecting module determines whether the to-be-detected signaling flow is abnormal.

If the to-be-detected signaling flow is abnormal, step 706 is performed. If the to-be-detected signaling flow is not abnormal, step 703 is performed.

703: The supervised signaling anomaly detecting module performs a second round of fine-level anomaly detection on the to-be-detected signaling flow based on message content.

704: The supervised signaling anomaly detecting module determines whether the to-be-detected signaling flow is abnormal.

If the to-be-detected signaling flow is abnormal, step 706 is performed. If the to-be-detected signaling flow is not abnormal, step 705 is performed.

705: The supervised signaling anomaly detecting module outputs, to the analysis result output module, an analysis result indicating that there is no anomaly.

The analysis result indicating that there is no anomaly indicates that the to-be-detected signaling flow is normal.

706: The supervised signaling anomaly detecting module outputs the to-be-detected signaling flow to the supervised anomaly locating module.

It may be learned from comparison between FIG. 7 and FIG. 5 that the supervised signaling anomaly detecting module and the unsupervised signaling anomaly detecting module have similar anomaly detection procedures, and a main difference is that implementations of step 701 and step 501 are different and implementations of step 703 and step 503 are different. Because the anomaly detection procedure in FIG. 7 covers all information elements in the message content rather than only the key information element, the procedure in the anomaly detection method in FIG. 7 has a wider anomaly detection range.

An optional solution of the supervised anomaly detecting module is setting up a signaling flow classification model (normal or abnormal) based on annotated signaling data by using the NLP technology, classifying the to-be-detected signaling flow, and completing anomaly detection. The following describes in detail an implementation in which the supervised anomaly detecting module performs anomaly detection, that is, implementations of step 701 and step 703.

In the anomaly detection based on the message type, after receiving the parsed to-be-detected signaling flow, the supervised anomaly detecting module may first sequentially perform feature construction on message type information of each signaling message in the to-be-detected flow, to obtain a message type feature sequence (corresponding to the second feature sequence) corresponding to the to-be-detected flow. Then, the supervised anomaly detecting module performs the coarse-level anomaly detection the to-be-detected signaling feature sequence by using a signaling flow classification model C (corresponding to the second signaling anomaly detection model) based on the message type.

In the first round of feature construction, each message type is used as a word in an NLP algorithm, and feature construction is performed by using a feature construction method for a word in the NLP. The feature construction method for a word includes but is not limited to One-hot encoding and BoW encoding. The supervised anomaly detecting module sequentially performs feature construction on the message types of the signaling in the to-be-detected flow to obtain a feature sequence. Each feature vector in the feature sequence corresponds to one message type.

In the first round of anomaly detection, for the feature sequence obtained after the feature construction, the supervised anomaly detecting module classifies the feature sequence by using a signaling flow classification model C based on the message type, to obtain a classification result indicating whether the to-be-detected signaling flow is abnormal. If the to-be-detected flow is classified to abnormal by using the signaling flow classification model C, the to-be-detected signaling flow is abnormal, and the abnormal to-be-detected signaling flow is directly output to the supervised signaling anomaly locating module 204 for anomaly locating. Otherwise, the to-be-detected signaling flow enters the second round of anomaly detection based on the message content. A model that may be used as the signaling flow classification model based on the message type may be but is not limited to a recurrent neural network (Recurrent Neural Networks, RNN) or a long short term memory (Long Short-Term Memory, LSTM) model.

In the anomaly detection based on the message content, because it is relatively difficult or even unable to reflect, in the message type of the signaling, a problem that single signaling is faulty, after no anomaly is detected in the first round of anomaly detection based on the message type, the supervised anomaly detecting module may perform the second round of anomaly detection on the to-be-detected signaling flow based on the message content. For the message content that includes several information elements in a signaling message, the supervised anomaly detecting module uses all or some of information elements in message content of signaling to perform anomaly detection. In other words, the supervised anomaly detecting module may first sequentially perform feature construction on all or some of information elements in the signaling messages in the to-be-detected flow, to obtain the feature sequence corresponding to the to-be-detected flow. Then, the supervised anomaly detecting module performs the fine-level anomaly detection on the feature sequence corresponding to the to-be-detected signaling flow, by using a signaling flow classification model D (corresponding to the first signaling anomaly detection model) based on the message content.

Figure 8:
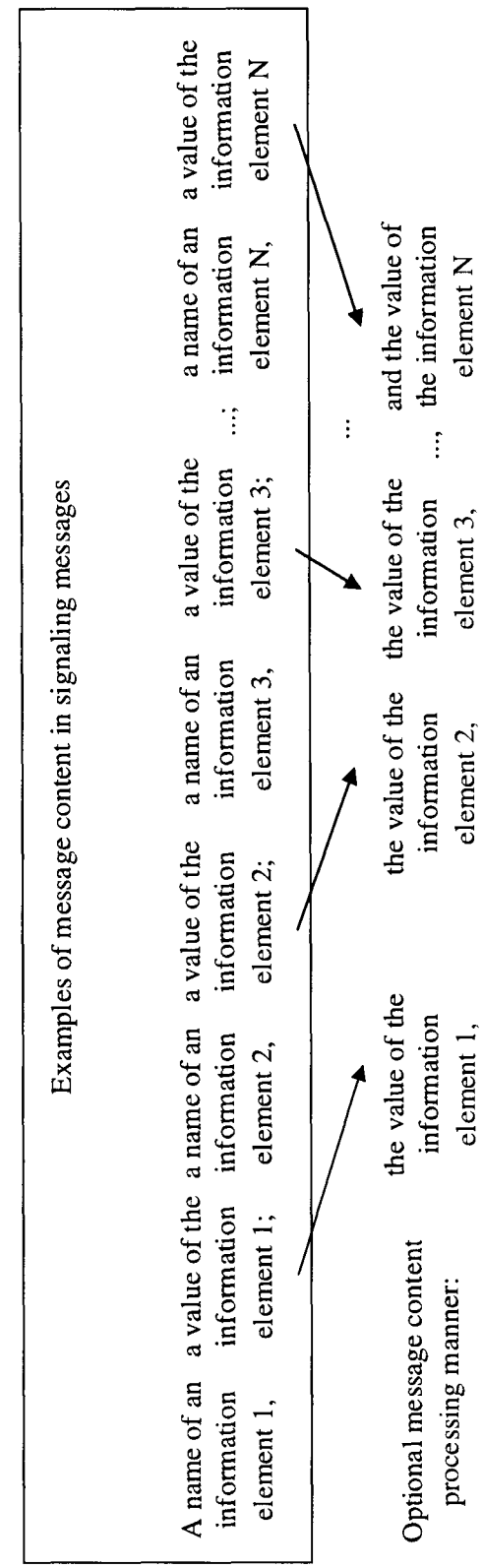
FIG. 8 is a schematic diagram of another feature construction according to an embodiment of this application.

In the second round of feature construction, message content including several information elements is considered as a text segment including several words, and feature construction is performed by using a feature construction method for a text segment in the NLP. For message content in each piece of signaling, as shown in FIG. 8, because information elements in signaling messages are distributed based on service function modules and an order in which service functions appear is fixed, an optional message content processing manner is successively extracting information element values of the information elements in the order in which the information elements appear in the message content, to convert the message content into the text segment with semantics. The feature construction method that is used by the supervised anomaly detecting module for the text segment includes but is not limited to an auto-encoding and BoW encoding. The supervised anomaly detecting module sequentially performs feature construction on the message content of the signaling in the to-be-detected flow to obtain a feature sequence. Each feature vector in the feature sequence corresponds to message content of one piece of signaling in the to-be-detected signaling message.

In the second round of anomaly detection, for the feature sequence obtained after the feature construction, the supervised anomaly detecting module may classify the feature sequence by using a signaling flow classification model D based on the message content, to obtain a classification result indicating whether the to-be-detected signaling flow is abnormal. If the to-be-detected flow is classified to abnormal by using the signaling flow classification model D, it is determined that the to-be-detected signaling flow is abnormal, and the abnormal to-be-detected signaling flow is directly output to the supervised anomaly locating module for anomaly locating. Otherwise, an analysis result indicating that there is no anomaly may be directly output to the analysis result output module 105. The signaling flow classification model D based on the message type may be but is not limited to an RNN and an LSTM model.

The signaling flow classification model C and the signaling flow classification model D that are used in the anomaly detection need to be obtained based on an annotated signaling training data set by using a machine learning method. The following describes implementations of obtaining the signaling flow classification model C and the signaling flow classification model D through training.

Optionally, a training method for obtaining the signaling flow classification model C through training is as follows: separately performing feature construction on a message type included in each piece of signaling in a signaling training flow to obtain a second training sample, where a feature vector in the second training sample is in a one-to-one correspondence with signaling in the signaling training flow; inputting the second training sample and second annotation information to a fourth training model (corresponding to the signaling flow classification model C) to perform anomaly detection processing, and obtaining a second anomaly detection processing result, where the second anomaly detection processing result indicates that the second training sample is a normal signaling flow or an abnormal signaling flow; determining, based on the second anomaly detection processing result and a second standard result, a loss corresponding to a first training sample, where the second standard result is a real result that is of the second training sample and that is indicated by the second annotation information; and updating a parameter of the fourth training model by using an optimization algorithm based on a loss corresponding to the second training sample, and obtaining a second signaling anomaly detection model (corresponding to the signaling flow classification model C).

Before training the signaling flow classification model C, the training apparatus may first obtain an annotated normal signaling flow and an annotated abnormal signaling flow as a data set for training the signaling flow classification model C; and perform feature construction on the message type of each piece of signaling in each signaling flow for each signaling flow in the data set, to obtain a feature sequence (including the second training sample) of each signaling flow. A data set in which a length of a largest signaling flow is 10 is used as an example. If a feature sequence of a message type in a signaling flow after feature construction is [a, b, c, d], a feature sequence that may be obtained for the signaling flow is [a, b, c, d, <bos>, <bos>, <bos>, <bos>, <bos>, <bos>]. Herein, <bos> is a vector corresponding to a placeholder after the feature construction. The training apparatus may perform modeling based on the feature sequence of each signaling flow and annotation information of each signaling flow, and learn a difference between a normal signaling flow and an abnormal signaling flow and respective characteristics of the two flows, to obtain the signaling flow classification model C for identifying the abnormal signaling flow. An LSTM classification model in which a sequence length is 10 is used as an example. Input data of the signaling flow classification model C is a feature sequence of a signaling flow and annotation information (abnormal or normal) corresponding to the signaling flow. A loss function used during training is cross entropy. When a loss value of the signaling flow classification model C is less than a specified loss threshold, a classification model that can be used to distinguish between a normal signaling flow and an abnormal signaling flow can be obtained. The loss value of the signaling flow classification model C is a loss value obtained through calculation by using the loss function.

Optionally, a training method for obtaining the signaling flow classification model D through training is as follows: separately performing feature construction on a message type and an information element that are included in each piece of signaling in a signaling training flow to obtain a first training sample, where a feature vector in the first training sample is in a one-to-one correspondence with signaling in the signaling training flow; inputting the first training sample and first annotation information to a third training model (corresponding to the signaling flow classification model D) to perform anomaly detection processing, and obtaining a first anomaly detection processing result, where the first anomaly detection processing result indicates that the first training sample is a normal signaling flow or an abnormal signaling flow; determining, based on the first anomaly detection processing result and a first standard result, a loss corresponding to the first training sample, where the first standard result is a real result that is of the first training sample and that is indicated by the first annotation information; and updating a parameter of the third training model by using an optimization algorithm based on the loss corresponding to the first training sample, to obtain a first signaling anomaly detection model (corresponding to the signaling flow classification model D).

Before training the signaling flow classification model D, the training apparatus may first obtain an annotated normal signaling flow and an annotated abnormal signaling flow as a data set for training the signaling flow classification model D; and perform feature construction on the message content of each piece of signaling in each signaling flow for each signaling flow in the data set, to obtain a feature sequence (including the first training sample) of each signaling flow. A data set in which a length of a largest flow is 10 is used as an example. If a feature sequence of message content in a signaling flow after feature construction is [a, b, c, d], a feature sequence that may be obtained for the signaling flow is [a, b, c, d, null, null, null, null, null, null]. Herein, null is a vector corresponding to a placeholder after the feature construction. The training apparatus may perform modeling based on the feature sequence of each signaling flow and annotation information of each signaling flow, and learn a difference between a normal signaling flow and an abnormal signaling flow and respective characteristics of the two flows, to obtain the signaling flow classification model D for identifying the abnormal signaling flow. An LSTM classification model in which a sequence length is 10 is used as an example. Input data of the signaling flow classification model D is a feature sequence of each signaling flow and annotation information (abnormal or normal) corresponding to the signaling flow. A loss function used during training may be cross entropy. When a loss value of the signaling flow classification model D is less than a specified loss threshold, a classification model that can be used to distinguish between a normal signaling flow and an abnormal signaling flow can be obtained. The loss value of the signaling flow classification model D is a loss value obtained through calculation by using the loss function.

The unsupervised signaling anomaly locating module 203 is configured to determine an anomaly location in the to-be-detected signaling flow, that is, determine a location of abnormal signaling in the to-be-detected signaling flow. In some embodiments, after the unsupervised signaling anomaly detecting module 201 detects that the to-be-detected signaling flow is abnormal, the unsupervised signaling anomaly locating module 203 further obtains the location of the abnormal signaling in the to-be-detected flow through analysis. Optionally, after receiving an abnormal to-be-detected flow and a feature sequence of the flow that are input from the unsupervised signaling anomaly detecting module 201, the unsupervised signaling anomaly locating module 203 may perform anomaly locating based on the input feature sequence, to complete anomaly locating.

Figure 9:
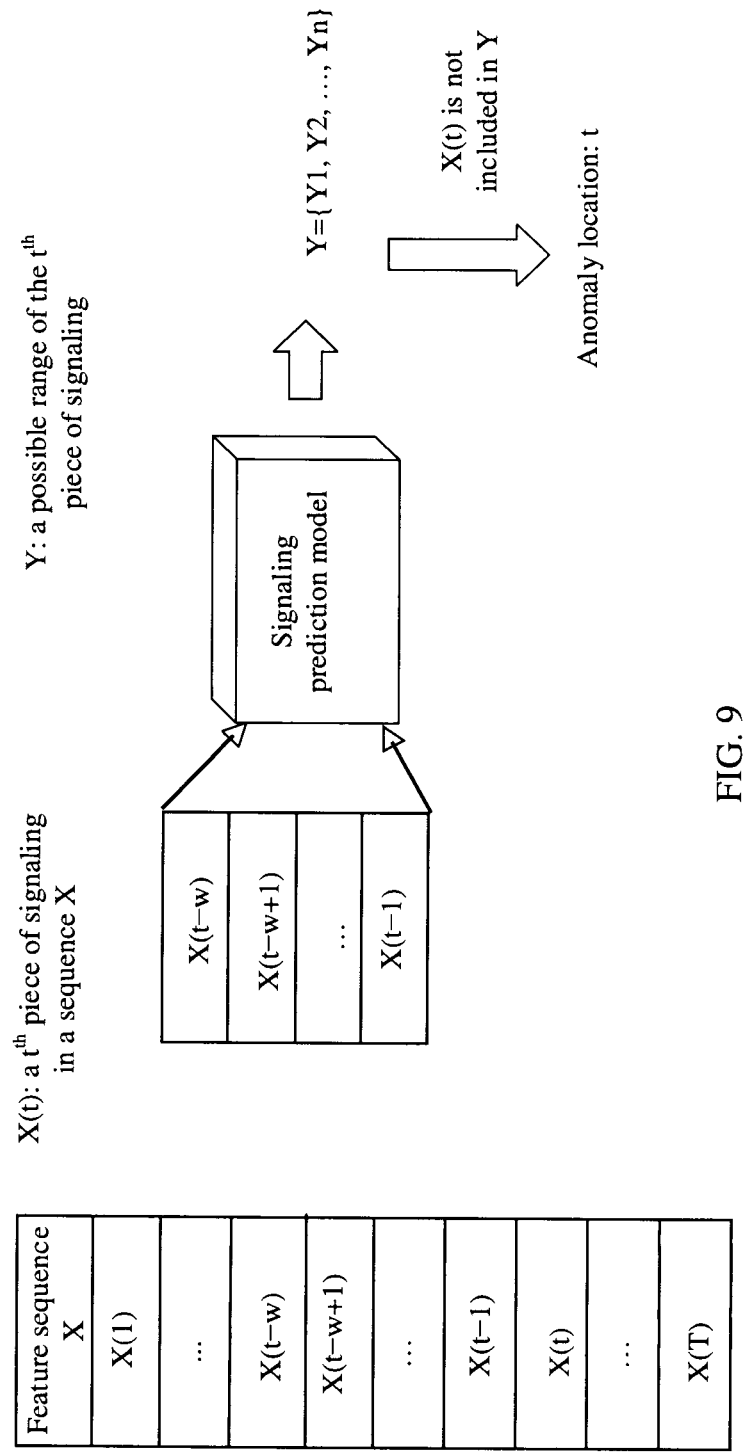
FIG. 9 is a schematic diagram of an anomaly locating process according to an embodiment of this application.

An optional solution of the unsupervised anomaly locating module is to use the signaling anomaly detection model A to perform anomaly locating on the to-be-detected signaling flow. An implementation of the optional solution is as follows: The unsupervised anomaly locating module separately performs detection from a $1^{st}$ feature vector in the to-be-detected feature sequence by using a sliding window with a window length of w and a step length of 1. The to-be-tested feature sequence may be a feature sequence corresponding to the to-be-detected signaling flow. The to-be-detected feature sequence may be from the unsupervised anomaly detecting module, or may be from the supervised anomaly detecting module. A $(t-w)^{th}$ feature vector, a $(t-w+1)^{th}$ feature vector, ..., and a $(t-1)^{th}$ feature vector in the to-be-detected feature sequence are input to the signaling anomaly detection model to perform anomaly detection processing, to obtain a possible range of a $t^{th}$ piece of signaling. If the $t^{th}$ piece of signaling in the to-be-detected flow is not in a predicted signaling range, it may be determined that the $t^{th}$ piece of signaling in the to-be-detected signaling flow is abnormal, and a result indicating the anomaly in the to-be-detected flow and an anomaly location may be output to the analysis result output module 105. Herein, w placeholders may be filled before a $1^{st}$ feature vector in the to-be-detected feature sequence, to predict a $1^{st}$ piece of signaling in the to-be-detected signaling flow. FIG. 9 is a schematic diagram of an anomaly locating process according to an embodiment of this application. As shown in FIG. 9, a feature sequence X represents a to-be-detected feature sequence, X(t) represents a $t^{th}$ feature vector in the to-be-detected feature sequence X, and Y represents a possible range of the $t^{th}$ piece of signaling (that is, all possible $t^{th}$ pieces of signaling). Input of a signaling anomaly detection model is a $(t-w)^{th}$ feature vector to a $(t-1)^{th}$ feature vector in the to-be-detected feature sequence, and output of the signaling anomaly detection model is the predicted $t^{th}$ piece of signaling.

The to-be-detected feature sequence may be a feature sequence obtained based on a message type, or may be a feature sequence obtained based on a message type and a key information element. When the unsupervised anomaly locating module receives the feature sequence based on the message type, the unsupervised anomaly locating module uses the signaling anomaly detection model A to perform anomaly locating. When the unsupervised anomaly locating module receives the feature sequence based on the message type and the key information element, the unsupervised anomaly locating module uses the signaling anomaly detection model B to perform anomaly locating.

The supervised anomaly locating module 204 is configured to determine an anomaly location in the to-be-detected signaling flow, that is, determine a location of abnormal signaling in the to-be-detected signaling flow. In some embodiments, after the supervised anomaly detecting module 202 detects that the to-be-detected signaling flow is abnormal, the supervised anomaly locating module 204 further obtains the location of the abnormal signaling in the to-be-detected flow through analysis. Optionally, after receiving an abnormal to-be-detected flow and a feature sequence of the flow that are input from the supervised anomaly detecting module 202, the supervised anomaly locating module 204 may perform anomaly locating based on the input feature sequence, to complete anomaly locating.

The signaling analysis apparatus inputs the to-be-detected signaling flow to the signaling flow classification model for anomaly detection processing, to obtain a probability that the to-be-detected signaling flow belongs to an abnormal flow. This probability may also be considered as an anomaly degree of the to-be-detected signaling flow. Therefore, an abnormal signaling interval, that is, a signaling interval in which abnormal signaling is located in the to-be-detected signaling flow may be located through analyzing the anomaly degree of the to-be-detected signaling flow.

Figure 10:
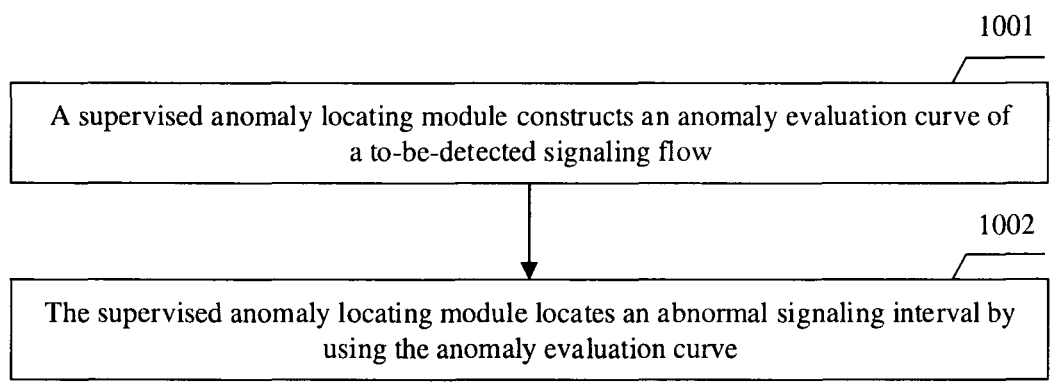
FIG. 10 is a flowchart of a signaling anomaly locating method according to an embodiment of this application.

An optional solution of the supervised anomaly locating module is first calculating an anomaly evaluation curve of the to-be-detected signaling flow by using the signaling flow classification model, and then locating the abnormal signaling interval based on fluctuation and transformation in the anomaly evaluation curve. FIG. 10 is a flowchart of a signaling anomaly locating method according to an embodiment of this application. As shown in FIG. 10, the method includes: 1001: The supervised anomaly locating module constructs an anomaly evaluation curve of the to-be-detected signaling flow. 1002: The supervised anomaly locating module locates an abnormal signaling interval by using the anomaly evaluation curve, that is, determines an anomaly location in the to-be-detected signaling flow.

Figure 11:
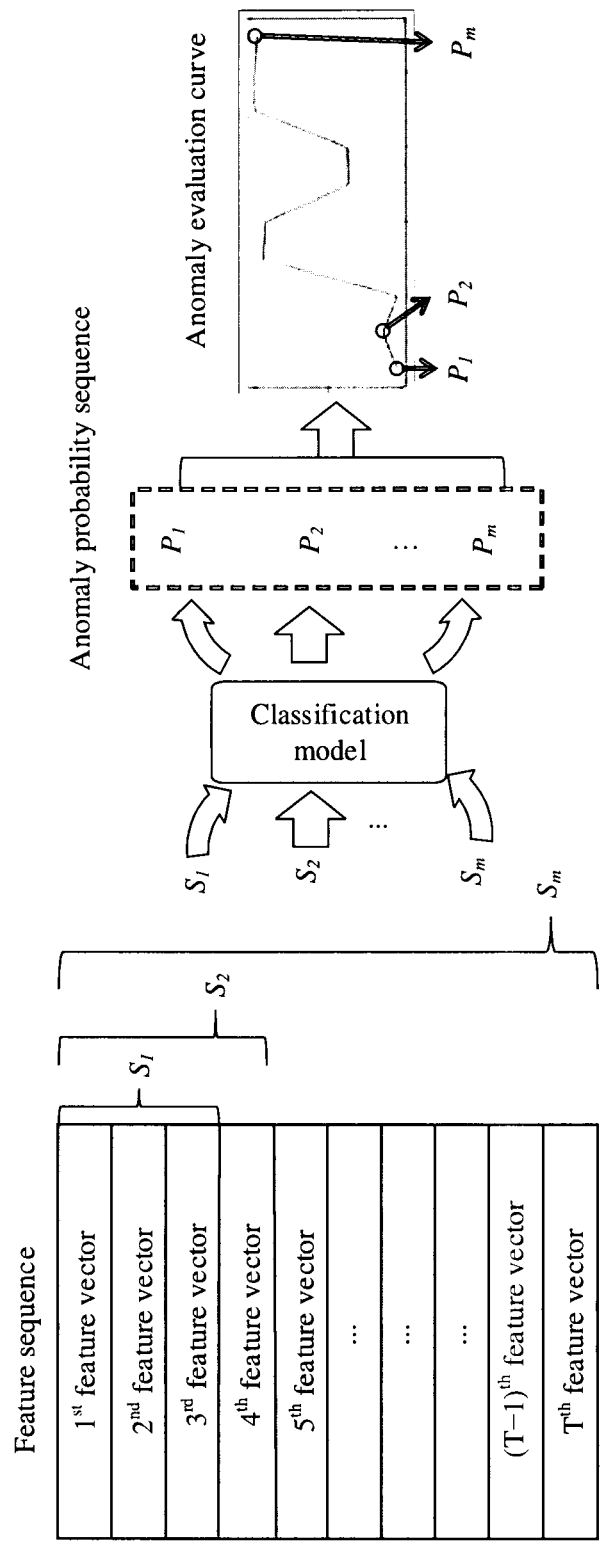
FIG. 11 is a schematic diagram of constructing an anomaly evaluation curve according to an embodiment of this application.

An example in which the supervised anomaly locating module constructs the anomaly evaluation curve is as follows: As shown in FIG. 11, for a to-be-detected signaling flow including N pieces of signaling, this module may sequentially separately input, to a signaling flow classification model, first three feature vectors ($S_1$), first four feature vectors ($S_2$), . . . , and first N feature vectors ($S_m$, m=N−2) in a feature sequence corresponding to the to-be-detected signaling flow, to obtain an anomaly evaluation probability $P_1$ of first three signaling segments (corresponding to $S_1$) of the to-be-detected signaling flow, an anomaly evaluation probability $P_2$ of first four signaling segments (corresponding to $S_2$), . . . , and an anomaly evaluation probability $P_m$ of first N signaling segments (corresponding to $S_m$). Then, the anomaly evaluation probabilities are sorted according to subscripts, to obtain the anomaly evaluation curve. A change range of the anomaly evaluation curve is between 0 and 1. A value of the anomaly evaluation curve increases with an anomaly degree of a signaling segment. It may be understood that the to-be-detected signaling flow corresponds to one anomaly probability sequence, and a $G^{th}$ probability in the anomaly probability sequence represents a probability that first (D+G) pieces of signaling in the N pieces of signaling include abnormal signaling. Herein, both G and D are integers greater than 0. For example, D is 2, and probabilities in the anomaly probability sequence are respectively $P_1$, $P_2$, . . . , and $P_m$. Herein, $P_1$ is the anomaly evaluation probability of the first three signaling segments in the to-be-detected signaling flow.

It should be understood that when the supervised anomaly locating module receives a feature sequence obtained through feature construction based on a message type, anomaly locating is performed by using the signaling flow classification model C. In other words, the feature sequence is input to the signaling flow classification model C for anomaly detection processing. When the supervised anomaly locating module receives a feature sequence obtained through feature construction based on message content, anomaly locating is performed by using the signaling flow classification model D. In other words, the feature sequence is input to the signaling flow classification model D for anomaly detection processing.

Generally, the to-be-detected signaling flow may be further divided into several sub-flows. A normal anomaly evaluation probability increases with a start of the sub-flow and decreases with a normal end of the sub-flow in the flow. Any anomaly occurring in any signaling in the flow, for example, a conflict with the above signaling message or a unnormal end of the sub-flow, will lead to a subsequent constantly high anomaly evaluation probability. Therefore, an explainable anomaly detection method may be provided for a user based on a fluctuation status of the anomaly evaluation curve.

For locating of an abnormal signaling interval, because anomaly evaluation curves generated in different anomaly conditions have different characteristics, the supervised anomaly locating module may first classify the anomaly evaluation curves based on the characteristics of the anomaly evaluation curves to obtain curve types to which the anomaly evaluation curves belong, and then locate abnormal intervals based on the curve types to which the anomaly evaluation curves belong. Table 2 shows an example of classification of anomaly evaluation intervals. For example, the anomaly evaluation curves may be classified into four types according to Table 2: steep rise, slow rise, fluctuation, and continued. Locating of an abnormal interval may be performed for each type in a manner in Table 3. Table 3 shows some methods for locating an abnormal interval. Because the anomaly evaluation curve is essentially a time sequence, the classification of curves may be completed by using a time sequence classification algorithm, and the locating of an abnormal interval may be completed by using a time sequence analysis method.

TABLE 2

Figure 17A:
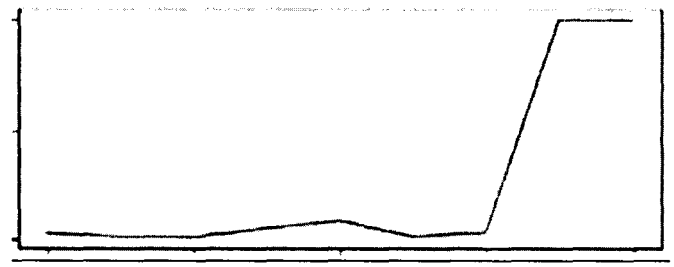
FIGS. 17A-17D provide an illustration of anomaly evaluation curves for anomaly evaluation intervals.
Figure 17B:
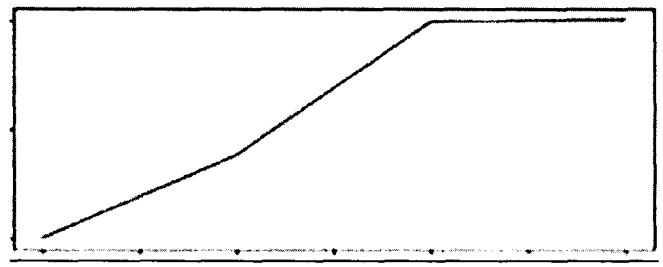
Figure 17C:
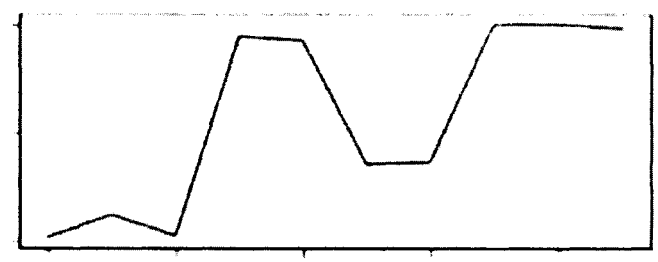
Figure 17D:
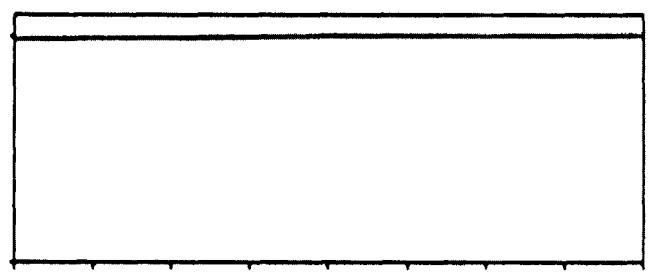

| | Type | Curve characteristic |
|---|---|---|
| 1 | Steep rise (FIG. 17A) | A curve first keeps at a low value, then steeply rises to a high value, and does not drop |
| 2 | Slow rise (FIG. 17B) | A curve slowly rises from a low value to a high value, and does not drop |
| 3 | Fluctuation (FIG. 17C) | A case in which a curve drops from a high value to a low value occurs for at least one time before the curve rises from a low value and stays at a high value |
| 4 | Continued (FIG. 17D) | A curve continuously keeps at a high value |

In Table 2, the low value (corresponding to a first threshold) may be 0.2, 0.25, or the like, and the high value (corresponding to a second threshold) may be 0.75, 0.8, 0.9, or the like. This is not limited in this application.

TABLE 3

Figure 18A:
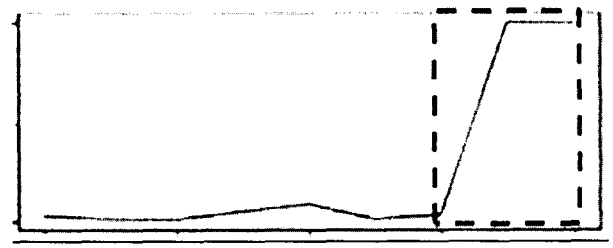
FIGS. 18A-18D provide an illustration of classifications of curves for anomaly ranges.
Figure 18B:
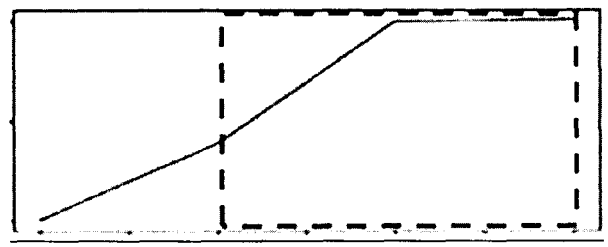
Figure 18C:
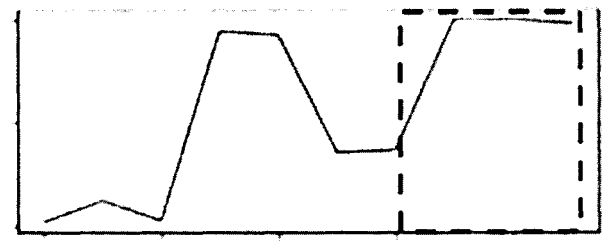
Figure 18D:
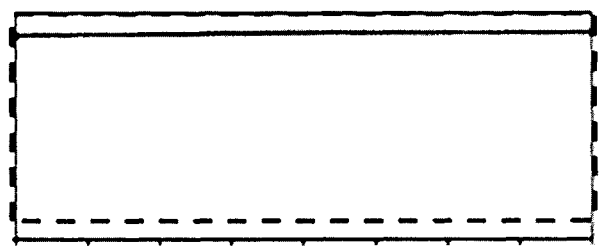

| Type | Anomaly range | Anomaly cause |
|---|---|---|
| Steep rise (FIG. 18A) | From a $1^{st}$ piece of signaling in a steep rise section to an end of a flow | Conflict information in a previous section of an interval; or an abnormal end of a sub-flow in the interval |
| Slow rise (FIG. 18B) | From a $1^{st}$ piece of signaling in a largest rise amplitude section to an end of a flow | Abnormal end of a sub-flow in an interval |
| Fluctuation (FIG. 18C) | From a $1^{st}$ piece of signaling in a latest rise section to an end of a flow | Conflict information in a previous section of an interval; or an abnormal end of a sub-flow in the interval |
| Continued (FIG. 18D) | From a third piece of signaling to an end of a flow | Abnormal end of a sub-flow in an interval |

For the steep rise section in Table 3, an optional method of determining is: calculating a difference between two adjacent points in a probability sequence, and if the difference is greater than a steep rise determining threshold (corresponding to a probability threshold), determining that a section between the two points is the steep rise section. The steep rise determining threshold may be 0.3, 0.4, 0.5, or the like. For the largest rise amplitude section in Table 3, an optional method of determining is: calculating a difference between adjacent points in the sequence, and selecting a section that has the largest difference greater than a rise amplitude threshold. The foregoing describes two methods for determining the steep rise section and the largest rise amplitude section in the anomaly evaluation curve but is not limited to the two methods.

The analysis result output module 105 is configured to complete output of an analysis result based on the signaling analysis result received by the analysis result output module 105. The signaling analysis result may be the anomaly detection result output by the anomaly detecting module, or may be the location of the abnormal signaling or the location of the abnormal signaling interval that is output by the anomaly locating module. In some embodiments, if the to-be-detected signaling flow is normal, the to-be-detected signaling flow and the analysis result "normal" of the to-be-detected signaling flow are output. If the to-be-detected signaling flow is abnormal and the analysis result is generated by the unsupervised signaling anomaly locating module 203, the to-be-detected signaling flow, the analysis result "abnormal", and the location of the abnormal signaling are output. If the to-be-detected signaling flow is abnormal and the analysis result is generated by the supervised anomaly locating module 204, the to-be-detected signaling flow, the analysis result "abnormal", and the location of the abnormal signaling interval are output.

The foregoing describes functions and implementations of modules involved in the foregoing embodiments. The following describes two embodiments of signaling anomaly detecting and locating with reference to application scenarios.

Figure 12:
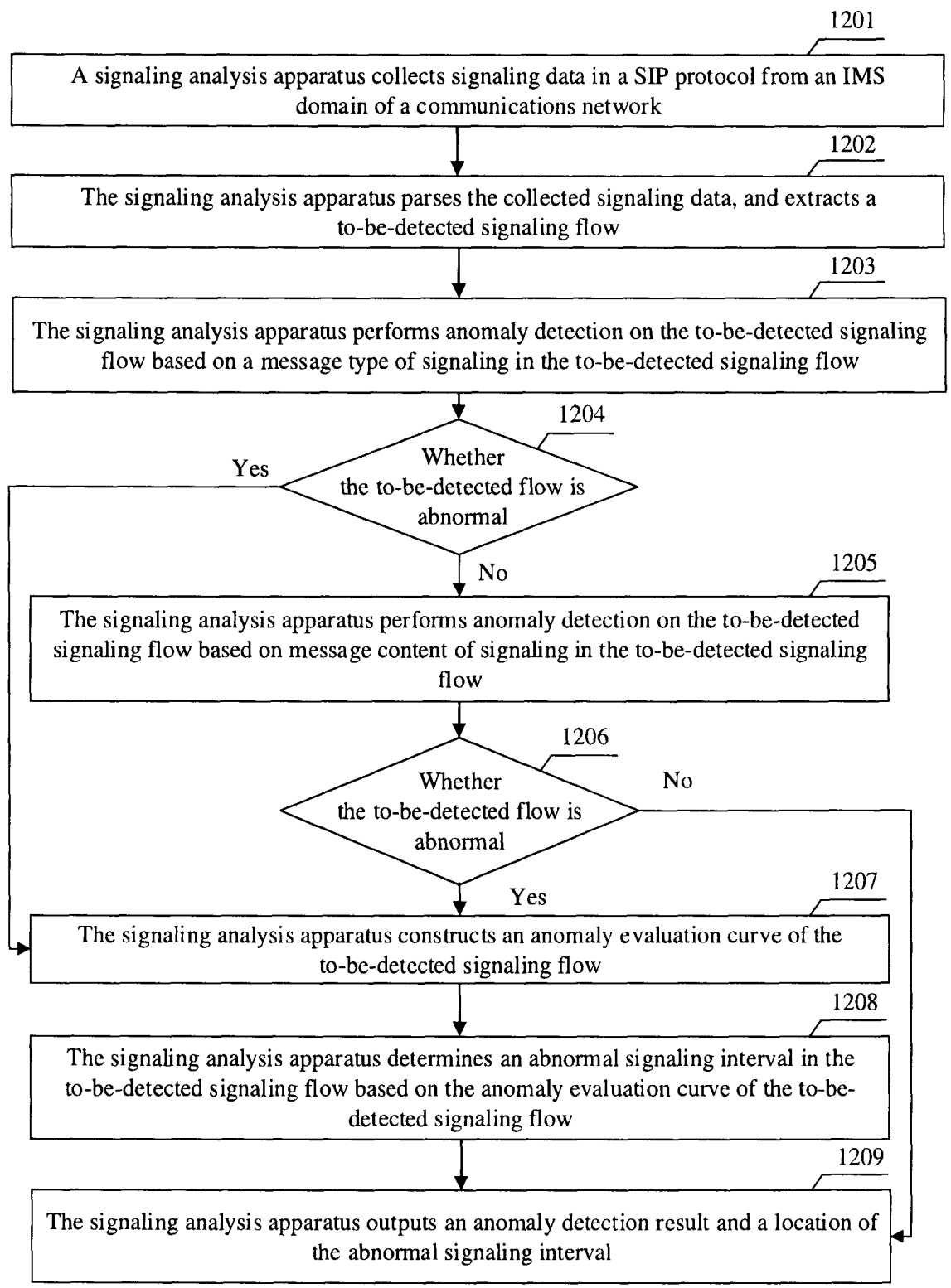
FIG. 12 is a flowchart of a signaling anomaly detecting and locating method according to an embodiment of this application.

FIG. 12 is a flowchart of a signaling anomaly detecting and locating method according to an embodiment of this application. FIG. 12 is further refinement and improvement of the method procedure in FIG. 2. As shown in FIG. 12, the method includes the following steps:

1201: A signaling analysis apparatus collects signaling data in a SIP protocol from an IMS domain of a communication network.

1202: The signaling analysis apparatus parses the collected signaling data, and extracts a to-be-detected signaling flow.

Optionally, for the collected signaling data, the signaling analysis apparatus first parses out a protocol, an interface, a timestamp, a flow identifier, a message type, and message content of each piece of signaling in the signaling data by using a SIP signaling parsing tool, and then completes signaling flow extraction based on the protocol, the interface, the timestamp, and the flow identifier. For example, steps of the signaling flow extraction are as follows: The signaling analysis apparatus may first divide signaling corresponding to the same interface, protocol, and flow identifier in the signaling data into the same group, and then sort signaling in each group of signaling according to an order of timestamps included in signaling in the group of signaling. It should be understood that signaling in each group of signaling corresponds to the same protocol, interface, and flow identifier. Therefore, each group of signaling obtained after the sorting corresponds to one to-be-detected signaling flow. In actual application, the signaling analysis apparatus may separately perform anomaly detecting and locating on each to-be-detected signaling flow.

1203: The signaling analysis apparatus performs anomaly detection on the to-be-detected signaling flow based on a message type of signaling in the to-be-detected signaling flow.

For example, the signaling analysis apparatus first sequentially performs One-hot encoding on the message type of the signaling in the to-be-detected signaling flow to obtain a message type feature sequence (corresponding to a second feature sequence) corresponding to the to-be-detected signaling flow, and then classifies the message type feature sequence by using a trained LSTM classification model based on a message type (corresponding to a signaling flow classification model C).

1204: Determine whether the to-be-detected signaling flow is abnormal.

If a classification result of the LSTM classification model is abnormal, step 1207 is performed, that is, the to-be-detected signaling flow is directly output to the supervised anomaly locating module. Otherwise, step 1205 is performed.

1205: The signaling analysis apparatus performs anomaly detection on the to-be-detected signaling flow based on message content of signaling in the to-be-detected signaling flow.

For the to-be-detected signaling flow with no anomaly detected in step 1203, the signaling analysis apparatus may first perform feature construction based on the message content of the signaling in the to-be-detected signaling flow to obtain a message content feature sequence (corresponding to a first feature sequence), and then classify the message content feature sequence by using a trained LSTM classification model based on message content (corresponding to a signaling flow classification model D). An example of performing the feature construction based on the message content of the signaling in the to-be-detected signaling flow to obtain a message content encoding sequence is as follows: (1) For message content of each signaling message, each information element is identified as a noun type, a numeric type, or an enumeration type. An information element type of each information element may be obtained in a training phase of the signaling flow classification model D by using a statistical classification method. Values of noun-type information elements are almost all different in different signaling flows. Values of enumeration-type information elements all come from a discrete value set including a limited quantity of discrete values in different flows. Values of numeric-type information elements come from a consecutive value space segment. (2) Filter out the noun-type information element in the message content. Because differentiation of the noun-type information element in a signaling analysis process is low, the noun-type information element in the message content is filtered out, that is, the noun-type information element in the message content no longer enters subsequent signaling analysis. (3) Discretize the numeric-type information element in the message content. Because it is relatively difficult to process the numeric-type information element by using the NLP technology, consecutive value space discretization is performed on the numeric-type information element in the message content with reference to an interval determining manner of an engineer. It is assumed that a maximum value of an information element in value space is Vmax, a minimum value is Vmin, and a quantity of intervals after the discretization is n. In this case, a unit interval length dl after the discretization is (Vmax−Vmin)/n. When a value of the information is x (Vmin≤x≤Vmax), the corresponding value after the discretization is ⌈(x−Vmin)/dl⌉. When the value of the information element is not in the value space, the corresponding value after the discretization is 0. Finally, after the foregoing processing, the message content in each piece of signaling may be considered as a text segment that includes a string of enumeration-type information elements and numeric-type information elements after the discretization, and may be converted into a feature vector with a fixed length by using an auto encoding method, to complete feature construction of the message content. (4) Convert, to a message content encoding sequence with a fixed length by using the auto encoding method, the message content as the text segment that includes the string of enumeration-type information elements and the numeric-type information elements after the discretization.

1206: Determine whether the to-be-detected signaling flow is abnormal.

If the classification result of the classification model is abnormal, step 1207 is performed, that is, the to-be-detected signaling flow is directly sent to the supervised anomaly locating module. If the classification result of the classification model is normal, step 1209 is performed, that is, the result "normal" is sent to an analysis result output module.

1207: The signaling analysis apparatus constructs an anomaly evaluation curve of the to-be-detected signaling flow.

If it is detected in step 1203 that the to-be-detected signaling flow is abnormal, the signaling analysis apparatus may construct the anomaly evaluation curve of the to-be-detected signaling flow based on the message type feature sequence. If it is detected in step 1205 that the to-be-detected signaling flow is abnormal, the signaling analysis apparatus may construct the anomaly evaluation curve of the to-be-detected signaling flow based on the message content feature sequence.

1208: The signaling analysis apparatus determines an abnormal signaling interval in the to-be-detected signaling flow based on the anomaly evaluation curve of the to-be-detected signaling flow.

Figure 13:
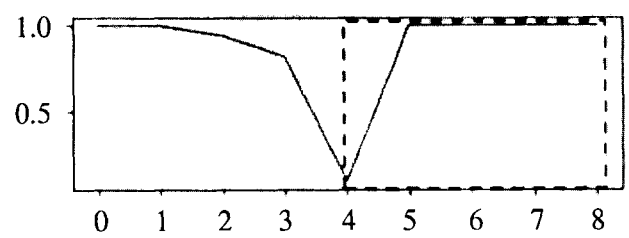
FIG. 13 is an anomaly evaluation curve of a to-be-detected signaling flow according to an embodiment of this application.

For the foregoing obtained anomaly assessment curve, the signaling analysis apparatus may first identify a type of each curve by using a time sequence classification algorithm, and then obtain the abnormal signaling interval in the to-be-detected flow by using the abnormal interval locating method in Table 3. For example, FIG. 13 is an anomaly evaluation curve of a to-be-detected signaling flow. Herein, a coordinate 0 on a horizontal axis corresponds to first three pieces of signaling in the to-be-detected signaling flow, a coordinate x corresponds to first (x+3) pieces of signaling in the to-be-detected signaling flow, and a dashed-line box is an abnormal signaling interval.

1209: The signaling analysis apparatus outputs an anomaly detection result and a location of the abnormal signaling interval.

For example, for a signaling flow whose signaling analysis result is abnormal, the analysis result output module outputs the signaling analysis result according to a format "abnormal, [location of an abnormal signaling interval]". For example, output corresponding to FIG. 13 is "abnormal, a $7^{th}$ piece of signaling to a $12^{th}$ piece of signaling are abnormal". For a signaling flow whose signaling analysis result is normal, the analysis result output module outputs "normal".

In the feature construction method applicable to various signaling protocols based on signaling information supported by the various signaling protocols in this embodiment driven by data, signaling flow anomaly detection is more comprehensively performed on message type information and message content information in the to-be-detected signaling flow by using a sequence classification model, and the location of the abnormal signaling interval is located.

Figure 14:
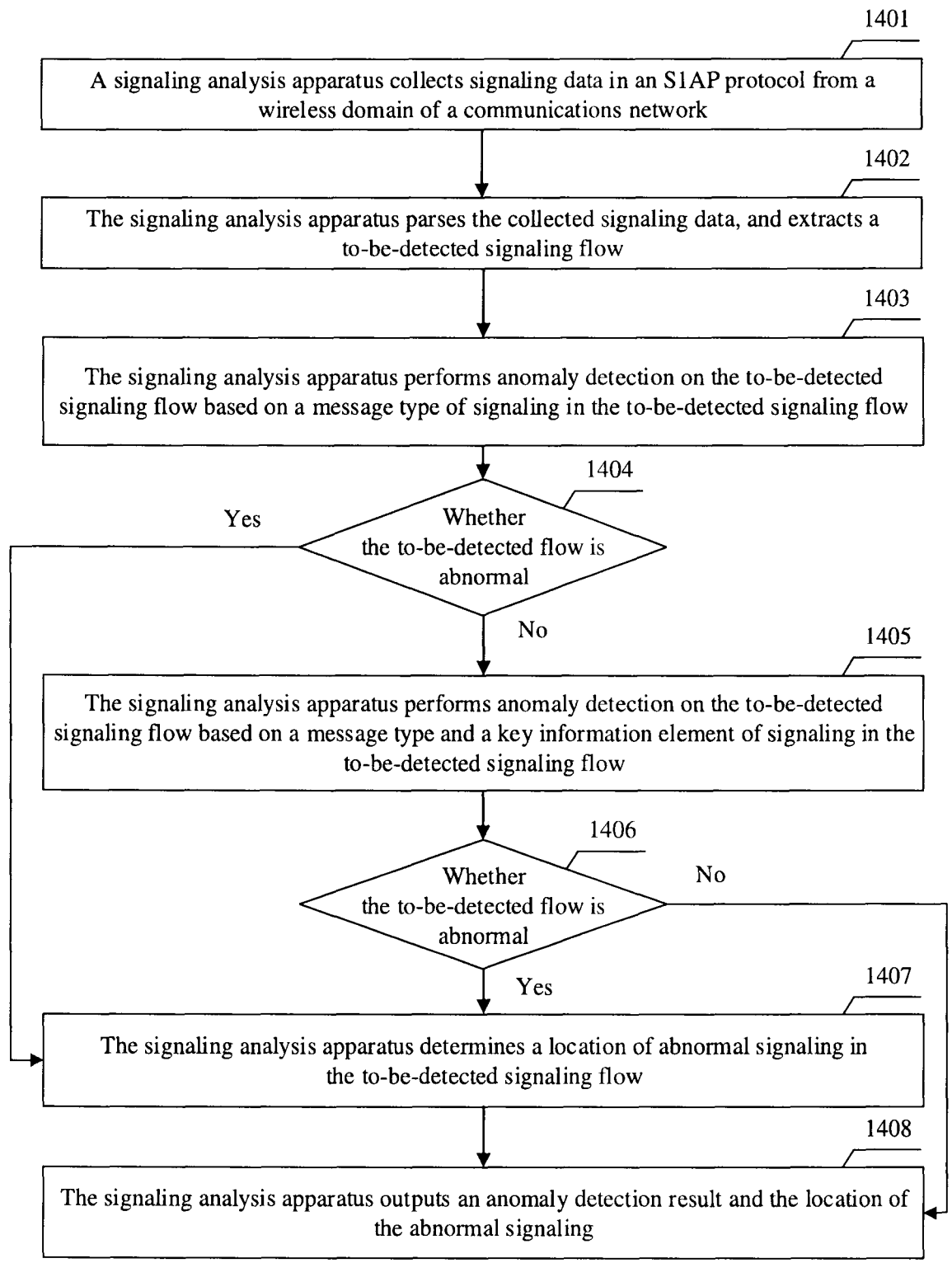
FIG. 14 is a flowchart of another signaling anomaly detecting and locating method according to an embodiment of this application.

FIG. 14 is a flowchart of a signaling anomaly detecting and locating method according to an embodiment of this application. FIG. 14 is further refinement and improvement of the method procedure in FIG. 2. As shown in FIG. 14, the method includes the following steps:

1401: A signaling analysis apparatus collects signaling data in an S1AP protocol from a wireless domain of a communication network.

1402: The signaling analysis apparatus parses the collected signaling data, and extracts a to-be-detected signaling flow.

Optionally, for the collected signaling data, the signaling analysis apparatus first parses out a protocol, an interface, a timestamp, a flow identifier, a message type, and message content of each piece of signaling in the signaling data by using an S1IP signaling parsing tool, and then completes signaling flow extraction based on the protocol, the interface, the timestamp, and the flow identifier. For example, steps of the signaling flow extraction are as follows: The signaling analysis apparatus may first divide signaling corresponding to the same interface, protocol, and flow identifier in the signaling data into the same group, and then sort signaling in each group of signaling according to an order of timestamps included in signaling in the group of signaling. It should be understood that signaling in each group of signaling corresponds to the same protocol, interface, and flow identifier. Therefore, signaling in each group of signaling obtained after the sorting corresponds to one to-be-detected signaling flow. In actual application, the signaling analysis apparatus may separately perform anomaly detecting and locating on each to-be-detected signaling flow.

1403: The signaling analysis apparatus performs anomaly detection on the to-be-detected signaling flow based on a message type of signaling in the to-be-detected signaling flow.

For example, the signaling analysis apparatus first fills w pieces of placeholder empty signaling (a message type and message content are both replaced with a placeholder <bos>) before a $1^{st}$ piece of signaling in the to-be-detected flow, and then sequentially performs One-hot encoding on the message type after the filling, to obtain a message type feature sequence corresponding to the to-be-detected flow. Then, the signaling analysis apparatus separately performs detection on the foregoing obtained message type feature sequence in a form of a sliding window (a window length is w) by using a trained NNLM anomaly detection model (corresponding to a signaling anomaly detection model A) based on a message type, to obtain an anomaly detection result of the to-be-detected signaling flow. When any signaling in the to-be-detected signaling flow is not in a prediction range of the to-be-detected signaling flow, it is determined that the to-be-detected flow is abnormal, that is, an anomaly detection result indicating that the to-be-detected signaling flow is abnormal is obtained. If any signaling in the to-be-detected signaling flow is in a prediction range of the to-be-detected signaling flow, it is determined that the to-be-detected signaling flow is normal, that is, an anomaly detection result indicating that the to-be-detected signaling flow is normal is obtained.

1404: Determine whether the to-be-detected signaling flow is abnormal.

If the anomaly detection result indicates that the to-be-detected signaling flow is abnormal, step 1407 is performed, that is, the to-be-detected signaling flow is directly sent to an unsupervised anomaly locating module. Otherwise, step 1405 is performed, that is, a second round of fine-level anomaly detection is performed on the to-be-detected flow.

1405: The signaling analysis apparatus performs anomaly detection on the to-be-detected signaling flow based on a message type and a key information element of signaling in the to-be-detected signaling flow.

Optionally, the signaling analysis apparatus separately uses a combination of a message type and a key information element of each piece of signaling in the to-be-detected signaling flow as a word to perform feature construction to obtain a feature sequence, and calculates a prediction result of each piece of signaling in the form of a sliding window to obtain the anomaly detection result of the flow. For example, the signaling analysis apparatus may first extract, as a key information element, an information element named cause-result from message content of each piece of signaling, and then splice, by using a sign "|", an information element value of the key information element with a message type to which the key information element belongs. If a type of signaling does not include an information element named cause-result, a message type of this type of signaling may be directly used as a splicing result. Then, the signaling analysis apparatus separately performs One-hot encoding on a splicing result of each piece of signaling in the to-be-detected flow, to obtain a feature sequence that is of the to-be-detected signaling flow and to which information about the key information element is added. Finally, the signaling analysis apparatus separately performs prediction on the foregoing obtained feature sequence in the form of a sliding window by using a trained NNLM anomaly detection model (corresponding to a signaling anomaly detection model B) based on a message type and a key information element. When any signaling in the to-be-detected signaling flow is not in a prediction range of the to-be-detected signaling flow, it is determined that the to-be-detected flow is abnormal, that is, an anomaly detection result indicating that the to-be-detected signaling flow is abnormal is obtained. If any signaling in the to-be-detected signaling flow is in a prediction range of the to-be-detected signaling flow, it is determined that the to-be-detected signaling flow is normal, that is, an anomaly detection result indicating that the to-be-detected signaling flow is normal is obtained. It should be understood that step 1405 is similar to step 1403, and a difference is different manners of constructing a feature sequence.

1406: Determine whether the to-be-detected signaling flow is abnormal.

The signaling analysis apparatus may determine, based on the anomaly detection result obtained in step 1405, whether the to-be-detected signaling flow is abnormal. If the to-be-detected signaling flow is abnormal, step 1407 is performed. If the to-be-detected signaling flow is normal, step 1408 is performed.

1407: The signaling analysis apparatus determines a location of abnormal signaling in the to-be-detected signaling flow.

Optionally, the signaling analysis apparatus separately performs detection from the $1^{st}$ piece of signaling in the to-be-detected signaling flow in the form of a sliding window. When a piece of signaling is not in a prediction range, it may be considered that the signaling is abnormal. In this case, a location of the signaling in the to-be-detected flow is output as a final anomaly locating result to the analysis result output module. A method in which this step can be omitted is as follows: In the anomaly detection processes in step 1403 and step 1405, for an abnormal to-be-detected signaling flow, a location at which a $1^{st}$ piece of abnormal signaling appears is directly output as a final anomaly locating result to the analysis result output module.

1408: The signaling analysis apparatus outputs an anomaly detection result and the location of the abnormal signaling.

Optionally, for a signaling flow whose signaling analysis result is abnormal, the analysis result output module outputs the signaling analysis result according to a format "abnormal, [location of abnormal signaling]", for example, "abnormal, a $7^{th}$ piece of signaling is abnormal". For a signaling flow whose signaling analysis result is normal, the analysis result output module outputs "normal".

For various signaling protocols of a control plane in the communication network, in this embodiment driven by data, signaling information supported by the protocols are extracted, and a general feature construction method is used, to effectively eliminate a format difference between signaling protocols and avoid a problem of the high costs and a poor self-update capability caused due to a summary of experts' rules. In the signaling analysis process, a sequence model is used in this embodiment to process a long-dependence relationship between signaling messages in a signaling flow. Feature encoding and anomaly detection are performed on message type information and information about a key information element in the signaling flow. In this way, most signaling anomaly problems other than a message type can be covered, to effectively avoid a problem of incomplete analysis on an abnormal key information element. In comparison with Embodiment 1 in FIG. 12, because model training in this embodiment requires collection of signaling data only in a normal case, this embodiment is easier to start.

Figure 15:
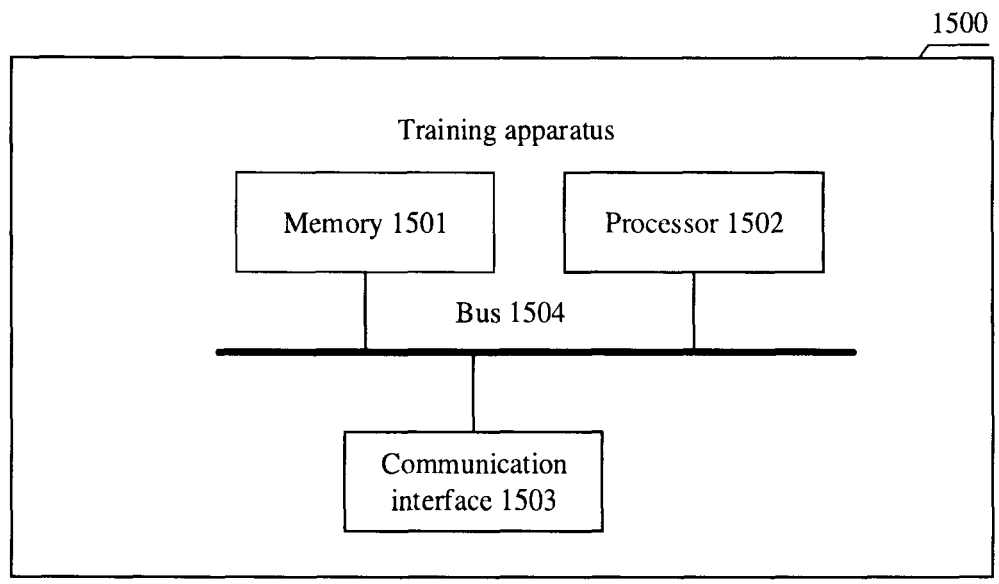
FIG. 15 is a schematic diagram of a structure of a training apparatus according to an embodiment of this application.

FIG. 15 is a schematic diagram of a hardware structure of a training apparatus according to an embodiment of this application. The training apparatus 1500 for a convolutional neural network shown in FIG. 15 (the apparatus 1500 may specifically be a computer device) includes a memory 1501, a processor 1502, a communication interface 1503, and a bus 1504. The memory 1501, the processor 1502, and the communication interface 1503 are communicatively connected to each other by using the bus 1504.

The memory 1501 may be a read-only memory (Read-Only Memory, ROM), a static storage device, a dynamic storage device, or a random access memory (Random Access Memory, RAM). The memory 1501 may store a program and training data. When the program stored in the memory 1501 is executed by the processor 1502, the processor 1502 is configured to perform the training method in the embodiments of this application.

The processor 1502 may be a general-purpose central processing unit (Central Processing Unit, CPU), a microprocessor, an application-specific integrated circuit (Application-Specific Integrated Circuit, ASIC), a GPU, or one or more integrated circuits, and is configured to execute a related program, to implement functions that need to be performed by the units in the training apparatus in this embodiment of this application, or perform the training method in the method embodiments of this application.

The communication interface 1503 uses a transceiver apparatus, for example, but not limited to, a transceiver, to implement communication between the apparatus 1500 and another device or a communication network. For example, the training data (for example, the first training set in the embodiments of this application) may be obtained by using the communication interface 1503.

The bus 1504 may include a path for transmitting information between components (for example, the memory 1501, the processor 1502, and the communication interface 1503) of the apparatus 1500.

Figure 16:
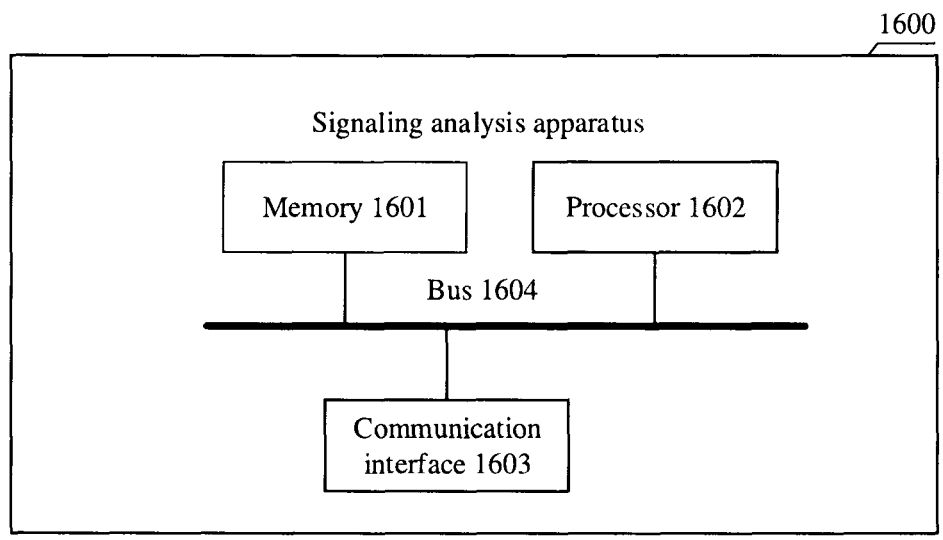
FIG. 16 is a schematic diagram of a structure of a signaling analysis apparatus according to an embodiment of this application.

FIG. 16 is a schematic diagram of a hardware structure of a signaling analysis apparatus according to an embodiment of this application. The signaling analysis apparatus 1600 (the apparatus 1600 may be specifically a computer device) shown in FIG. 16 includes a memory 1601, a processor 1602, a communication interface 1603, and a bus 1604. The memory 1601, the processor 1602, and the communication interface 1603 are communicatively connected to each other by using the bus 1604.

The memory 1601 may be a read-only memory, a static storage device, a dynamic storage device, or a random access memory. The memory 1601 may store a program. When the program stored in the memory 1601 is executed by the processor 1602, the processor 1602 is configured to perform the steps of the signaling analysis method in the embodiments of this application.

The processor 1602 may be a general-purpose central processing unit, a microprocessor, an application-specific integrated circuit, a graphics processing unit (graphics processing unit, GPU), or one or more integrated circuits, and is configured to execute a related program, to implement functions that need to be performed by the units in the signaling analysis apparatus in this embodiment of this application, or perform the signaling analysis method in the method embodiments of this application. The processor may implement functions of the modules in FIG. 1B.

The processor 1602 may alternatively be an integrated circuit chip and has a signal processing capability. In an implementation process, the steps of the signaling analysis method in this application may be completed by using a hardware integrated logic circuit in the processor 1602 or instructions in a form of software. The processor 1602 may alternatively be a general-purpose processor, a digital signal processor (Digital Signal Processing, DSP), an application-specific integrated circuit (ASIC), a field programmable gate array (Field Programmable Gate Array, FPGA) or another programmable logic device, a discrete gate or transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. The steps of the methods disclosed with reference to the embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1601. The processor 1602 reads information in the memory 1601, and completes, in combination with hardware of the processor 1602, the function that needs to be performed by the units of the signaling analysis apparatus in this embodiment of this application, or perform the signaling analysis method in the method embodiments of this application.

The communication interface 1603 uses a transceiver apparatus, for example, but not limited to, a transceiver, to implement communication between the apparatus 1600 and another device or a communication network. For example, signaling data may be obtained by using the communication interface 1603.

The bus 1604 may include a path for transmitting information between various components (for example, the memory 1601, the processor 1602, and the communication interface 1603) of the apparatus 1600.

It should be noted that although only the memory, the processor, and the communication interface of each of the training apparatus 1500 shown in FIG. 15 and the signaling analysis apparatus 1600 shown in FIG. 16 are illustrated, in a specific implementation process, a person skilled in the art should understand that the training apparatus 1500 and the signaling analysis apparatus 1600 each further include other components necessary for implementing normal operation. In addition, according to a specific requirement, a person skilled in the art should understand that the training apparatus 1500 and the signaling analysis 1600 each may further include hardware components for implementing other additional functions. In addition, a person skilled in the art should understand that the training apparatus 1500 and the signaling analysis apparatus 1600 each may include only components necessary for implementing the embodiments of this application, but not necessarily include all the components shown in FIG. 15 and FIG. 16.

An embodiment further provides a computer-readable storage medium. The computer-readable storage medium stores instructions, and when the instructions are run on a computer, the computer is enabled to perform the method provided in the foregoing embodiments.

An embodiment further provides a computer-readable storage medium. The computer-readable storage medium stores instructions, and when the instructions are run on a computer, the computer is enabled to perform the training method provided in the foregoing embodiments.

An embodiment provides a computer program product including instructions. When the computer program product is run on a computer, the computer is enabled to perform the method provided in the foregoing embodiments.

The foregoing descriptions are merely specific implementations and are not intended to limit the protection scope of this disclosure. Any variation or replacement readily figured out by a person skilled in the art within the technical scope disclosed shall fall within the protection scope of this disclosure as provided in the accompanying claims.

What is claimed is:

1. A method for signaling anomaly detection, the method comprising:
   obtaining, by a signaling analysis apparatus, a to-be-detected signaling flow, wherein the to-be-detected signaling flow comprises N pieces of signaling, where N is an integer greater than 1;
   performing, by the signaling analysis apparatus, first feature construction on a message type and on an information element that are included in each of the N pieces of signaling to obtain a first feature sequence, the first feature sequence comprising N first feature vectors, the N first feature vectors being in a one-to-one correspondence with the N pieces of signaling;
   inputting the first feature sequence to a first signaling anomaly detection model;
   performing anomaly detection processing; and
   outputting a first anomaly detection result indicating that the to-be-detected signaling flow is normal or abnormal.

2. The method according to claim 1, further comprising:
   performing second feature construction on the message type included in each of the N pieces of signaling to obtain a second feature sequence, the second feature sequence comprising N second feature vectors in a one-to-one correspondence with the N pieces of signaling;
   inputting the second feature sequence to a second signaling anomaly detection model;
   performing anomaly detection processing;
   obtaining a second anomaly detection result indicating that the to-be-detected signaling flow is normal or abnormal;
   wherein performing first feature construction on the message type and on the information element comprises:
   in response to the second anomaly detection result indicating that the to-be-detected signaling flow is normal, separately performing the first feature construction on each of the N pieces of signaling to obtain the first feature sequence.

3. The method according to claim 2, wherein separately performing second feature construction on the message type included in each of the N pieces of signaling comprises:
   including a second message type as a word in the natural language processing NLP algorithm and performing feature construction on the word to obtain a third vector, the second message type being a message type included in third signaling, the third signaling being any of the N pieces of signaling and the third vector being included in the second feature sequence.

4. The method according to claim 1, wherein performing first feature construction on the message type and on the information element comprises:
   performing feature construction on a combination of a first message type and a target information element to obtain a first vector, wherein the first message type is a message type included in first signaling, the target information element is an information element included in the first signaling, the first signaling is any of the N pieces of signaling, and the first vector is included in the first feature sequence.

5. The method according to claim 1, wherein performing first feature construction on the message type and on the information element comprises:
   using M information elements in second signaling as text that comprises one or more words in a natural language processing NLP algorithm performing feature construction on the text to obtain a second vector, the second signaling being any of the N pieces of signaling, the second vector being included in the first feature sequence, and M is an integer greater than 1.

6. The method according to claim 1, wherein an $F^{th}$ first feature vector in the first feature sequence corresponds to an $F^{th}$ piece of signaling in the N pieces of signaling and the inputting the first feature sequence to a first signaling anomaly detection model to perform anomaly detection processing and outputting a first anomaly detection result comprises:
   in an $F^{th}$ round of anomaly detection processing, inputting a third feature sequence to the first signaling anomaly detection model and performing anomaly detection processing to obtain a first set comprising at least one combination of a message type and an information element, feature vectors in the third feature sequence being successively an $(F-K)^{th}$ first feature vector to an $(F-1)^{th}$ first feature vector in the first feature sequence, F being an integer greater than 1, and K being an integer greater than 1 and less than F; and
   outputting the first anomaly detection result when a combination of a message type and an information element of the $F^{th}$ piece of signaling in the N pieces of signaling is not included in the first set, the first anomaly detection result indicating that the to-be-detected signaling flow is abnormal.

7. The method according to claim 6, further comprising:
   performing an $(F+1)^{th}$ round of anomaly detection processing when the combination of the message type and the information element of the $F^{th}$ piece of signaling is included in the first set and F is less than N; or
   outputting the first anomaly detection result when the combination of the message type and the information element of the $F^{th}$ piece of signaling is included in the first set and F is equal to N, the first anomaly detection result indicating that the to-be-detected signaling flow is normal.

8. The method according to claim 1, further comprising:
   determining an anomaly location in the to-be-detected signaling flow when the first anomaly detection result indicates that the to-be-detected signaling flow is abnormal.

9. The method according to claim 8, wherein an $H^{th}$ first feature vector in the first feature sequence corresponds to an $H^{th}$ piece of signaling in the N pieces of signaling and the determining an anomaly location in the to-be-detected signaling flow comprises:
   in an $H^{th}$ round of signaling anomaly locating, inputting a fifth feature sequence to the first signaling anomaly detection model and performing anomaly detection processing to obtain a third set comprising at least one combination of a message type and an information element, feature vectors in the fifth feature sequence being successively an $(H-L)^{th}$ first feature vector to an $(H-1)^{th}$ first feature vector in the first feature sequence, H being an integer greater than 1 and L is being an integer greater than 1 and less than H; and when a combination of a message type and an information element of the $H^{th}$ piece of signaling in the N pieces of signaling is not comprised in the third set, determining that the $H^{th}$ piece of signaling is abnormal.

10. The method according to claim 8, wherein an $H^{th}$ first feature vector in the first feature sequence corresponds to an $H^{th}$ piece of signaling in the N pieces of signaling, and the determining an anomaly location in the to-be-detected signaling flow comprises:

obtaining an anomaly probability sequence corresponding to the N pieces of signaling, wherein a $G^{th}$ probability in the anomaly probability sequence represents a probability that first (D+G) pieces of signaling in the N pieces of signaling comprise abnormal signaling, and G and D are both integers greater than 0; and determining the anomaly location in the to-be-detected signaling flow based on the anomaly probability sequence.

11. A non-transitory signaling analysis apparatus, comprising a processor and a memory, the memory being configured to store program instructions that, when executed by the processor, cause the signaling analysis apparatus to perform operations comprising:

obtaining a to-be-detected signaling flow, wherein the to-be-detected signaling flow includes N pieces of signaling, N being an integer greater than 1;

performing first feature construction on a message type and an information element that are included in each of the N pieces of signaling to obtain a first feature sequence, the first feature sequence comprising N first feature vectors, the N first feature vectors being in a one-to-one correspondence with the N pieces of signaling; and inputting the first feature sequence to a first signaling anomaly detection model to perform anomaly detection processing to produce a first anomaly detection result indicating that the to-be-detected signaling flow is normal or abnormal.

12. The apparatus according to claim 11, the program instructions being configured, upon execution by the processor, to cause the signaling analysis apparatus to:

perform operations comprising second feature construction on the message type included in each of the N pieces of signaling to obtain a second feature sequence, the second feature sequence comprising N second feature vectors, the N second feature vectors being in a one-to-one correspondence with the N pieces of signaling; and input the second feature sequence to a second signaling anomaly detection model to perform anomaly detection processing to produce a second anomaly detection result indicating that the to-be-detected signaling flow is normal or abnormal, the processor being configured to, if the second anomaly detection result indicates that the to-be-detected signaling flow is normal, perform the first feature construction on each of the N pieces of signaling to obtain the first feature sequence.

13. The apparatus according to claim 12, the program instructions being configured, upon execution by the processor, to cause the signaling analysis apparatus to:

perform, using a second message type as a word in the natural language processing NLP algorithm, feature construction on the word to obtain a third vector, wherein the second message type is a message type included in third signaling, the third signaling being any of the N pieces of signaling, and the third vector being included in the second feature sequence.

14. The apparatus according to claim 11, the program instructions being configured, upon execution by the processor, to cause the signaling analysis apparatus to:

perform, using a combination of a first message type and a target information element feature construction on the combination to obtain a first vector, wherein the first message type is a message type included in first signaling, the target information element is an information element included in the first signaling, the first signaling is any of the N pieces of signaling, and the first vector is included in the first feature sequence.

15. The apparatus according to claim 14, the program instructions being configured, upon execution by the processor, to cause the signaling analysis apparatus to:

perform, using M information elements in second signaling as text including one or more words in a natural language processing NLP algorithm, feature construction on the text to obtain a second vector, wherein the second signaling is any of the N pieces of signaling, the second vector includes the first feature sequence, and M is an integer greater than 1.

16. The apparatus according to claim 11, the program instructions being configured, upon execution by the processor, to cause the signaling analysis apparatus to:

perform anomaly detection processing in an $F^{th}$ round of anomaly detection processing comprising inputting a third feature sequence to the first signaling anomaly detection model to obtain a first set, wherein the first set comprises at least one combination of a message type and an information element, and feature vectors in the third feature sequence are successively an $(F-K)^{th}$ first feature vector to an $(F-1)^{th}$ first feature vector in the first feature sequence, F being an integer greater than 1 and K being an integer greater than 1 and less than F; and output the first anomaly detection result when a combination of a message type and an information element of an $F^{th}$ piece of signaling in the N pieces of signaling is not included in the first set, the first anomaly detection result indicating that the to-be-detected signaling flow is abnormal.

17. The apparatus according to claim 16, the program instructions being configured, upon execution by the processor, to cause the signaling analysis apparatus to:

perform an $(F+1)^{th}$ round of anomaly detection processing when the combination of the message type and the information element of the $F^{th}$ piece of signaling is included in the first set and F is less than N; or output the first anomaly detection result when the combination of the message type and the information element of the $F^{th}$ piece of signaling is included in the first set and F is equal to N, the first anomaly detection result indicating that the to-be-detected signaling flow is normal.

18. The apparatus according to claim 11, wherein:
an $F^{th}$ second feature vector in the second feature sequence corresponds to an $F^{th}$ piece of signaling in the N pieces of signaling; and
the program instructions are configured, upon execution by the processor, to cause the signaling analysis apparatus to:
  input a fourth feature sequence to the second signaling anomaly detection model in an $F^{th}$ round of anomaly detection processing and perform anomaly detection processing to obtain a second set, wherein the second set comprises at least one message type, and feature vectors in the fourth feature sequence are successively an $(F-K)^{th}$ second feature vector to an $(F-1)^{th}$ second feature vector in the second feature sequence, F being an integer greater than 1 and K being an integer greater than 1 and less than F; and
  obtain the second anomaly detection result when a message type of the $F^{th}$ piece of signaling in the N pieces of signaling is not included in the second set, wherein the second anomaly detection result indicates that the to-be-detected signaling flow is abnormal.

19. The apparatus according to claim 18, the program instructions being configured, upon execution by the processor, to cause the signaling analysis apparatus to:
  perform an $(F+1)^{th}$ round of anomaly detection processing when the message type of the $F^{th}$ piece of signaling is included in the second set and F is less than N; or
  obtain the second anomaly detection result when the message type of the $F^{th}$ piece of signaling is included in the second set and F is equal to N, wherein the second anomaly detection result indicates that the to-be-detected signaling flow is normal.

20. The apparatus according to claim 11, the program instructions being configured, upon execution by the processor, to cause the signaling analysis apparatus to determine an anomaly location in the to-be-detected signaling flow when the first anomaly detection result indicates that the to-be-detected signaling flow is abnormal.

21. The apparatus according to claim 20, wherein:
an $H^{th}$ first feature vector in the first feature sequence corresponds to an $H^{th}$ piece of signaling in the N pieces of signaling; and
the program instructions are configured, upon execution by the processor, to cause the signaling analysis apparatus to:
  input a fifth feature sequence to the first signaling anomaly detection model in an $H^{th}$ round of signaling anomaly locating and perform anomaly detection processing to obtain a third set, wherein the third set comprises at least one combination of a message type and an information element, and feature vectors in the fifth feature sequence are successively an $(H-L)^{th}$ first feature vector to an $(H-1)^{th}$ first feature vector in the first feature sequence, where H is an integer greater than 1 and L is an integer greater than 1 and less than H; and
  determine that the $H^{th}$ piece of signaling is abnormal when a combination of a message type and an information element of the $H^{th}$ piece of signaling in the N pieces of signaling is not included in the third set.

22. The apparatus according to claim 20, wherein:
an $H^{th}$ first feature vector in the first feature sequence corresponds to an $H^{th}$ piece of signaling in the N pieces of signaling; and
the program instructions are configured, upon execution by the processor, to cause the signaling analysis apparatus to:
  obtain an anomaly probability sequence corresponding to the N pieces of signaling, wherein a $G^{th}$ probability in the anomaly probability sequence represents a probability that first (D+G) pieces of signaling in the N pieces of signaling comprise abnormal signaling, and G and D are both integers greater than 0; and
  determine the anomaly location in the to-be-detected signaling flow based on the anomaly probability sequence.

23. The apparatus according to claim 22, the program instructions being configured, upon execution by the processor, to cause the signaling analysis apparatus to:
  input a sixth feature sequence to the first signaling anomaly detection model, and perform anomaly detection processing to obtain a $G^{th}$ probability in the anomaly probability sequence, wherein feature vectors comprised in the sixth feature sequence are successively first (D+G) first feature vectors in the first feature sequence.

24. The apparatus according to claim 22, the program instructions being configured, upon execution by the processor, to cause the signaling analysis apparatus to:
  determine that signaling in a first signaling interval is abnormal when a difference between the $G^{th}$ probability and a $(G-1)^{th}$ probability in the anomaly probability sequence is greater than a probability threshold, wherein the first signaling interval comprises a $(G+D-1)^{th}$ piece of signaling to an $N^{th}$ piece of signaling in the N pieces of signaling and G is an integer greater than 1;
  determine that signaling in a second signaling interval is abnormal when each probability in the anomaly probability sequence is not less than a previous probability, wherein the second signaling interval comprises a $(P+D)^{th}$ piece of signaling to the $N^{th}$ piece of signaling in the N pieces of signaling, a difference between a $P^{th}$ probability and a $(P+1)^{th}$ probability in the anomaly probability sequence is not less than a difference between any two adjacent probabilities in the anomaly probability sequence, and P is an integer greater than 0;
  determine that signaling in a third signaling interval is abnormal when a probability in the anomaly probability sequence increases from a first value to a second value and decreases from a third value to the first value before the second value is maintained, wherein the first value is less than a first threshold, the second value and the third value are both greater than a second threshold, the first threshold is less than the second threshold, the third signaling interval comprises a $(Q+D)^{th}$ piece of signaling to the $N^{th}$ piece of signaling in the N pieces of signaling, a $Q^{th}$ probability in the anomaly probability sequence is a probability at a start point of a final rise section in an anomaly probability curve, and Q is an integer greater than 0; and
  determine that signaling in a fourth signaling interval is abnormal when each probability in the anomaly probability sequence is not less than the probability threshold, wherein the fourth signaling interval comprises a $D^{th}$ piece of signaling to the $N^{th}$ piece of signaling in the N pieces of signaling.

25. A non-transitory computer-readable storage medium storing a computer program including program instructions to perform:

obtaining a to-be-detected signaling flow, wherein the to-be-detected signaling flow comprises N pieces of signaling, where N is an integer greater than 1;

performing first feature construction on a message type and an information element that is included in each of the N pieces of signaling to obtain a first feature sequence, the first feature sequence comprising N first feature vectors, the N first feature vectors being in a one-to-one correspondence with the N pieces of signaling;

inputting the first feature sequence to a first signaling anomaly detection model to perform anomaly detection processing; and outputting a first anomaly detection result indicates that the to-be-detected signaling flow is normal or abnormal.

* * * * *